US011656513B2

(12) United States Patent
Itou

(10) Patent No.: US 11,656,513 B2
(45) Date of Patent: May 23, 2023

(54) DISPLAY DEVICE

(71) Applicant: Japan Display Inc., Tokyo (JP)

(72) Inventor: Osamu Itou, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 17/585,868

(22) Filed: Jan. 27, 2022

(65) Prior Publication Data

US 2022/0146896 A1 May 12, 2022

Related U.S. Application Data

(63) Continuation of application No. PCT/JP2020/025404, filed on Jun. 26, 2020.

(30) Foreign Application Priority Data

Jul. 31, 2019 (JP) .............................. JP2019-141427

(51) Int. Cl.
*G02F 1/1362* (2006.01)

(52) U.S. Cl.
CPC .. *G02F 1/136222* (2021.01); *G02F 1/136286* (2013.01)

(58) Field of Classification Search
CPC ........... G02F 1/136286; G02F 1/13394; G02F 1/136222; G02F 2201/52; G09F 9/302; G09F 9/30
See application file for complete search history.

(56) References Cited

U.S. PATENT DOCUMENTS

| 2001/0025958 | A1 | 10/2001 | Yamazaki et al. |
| 2005/0040760 | A1 | 2/2005 | Taguchi et al. |
| 2006/0221027 | A1 | 10/2006 | Ishihara et al. |
| 2013/0307868 | A1* | 11/2013 | Jeong .................. G09G 3/2003 345/600 |
| 2015/0312505 | A1* | 10/2015 | Sugawara .............. H04N 5/357 348/294 |
| 2017/0059952 | A1 | 3/2017 | Itou et al. |

FOREIGN PATENT DOCUMENTS

| EP | 0302653 A2 * | 2/1989 |
| JP | 62-019804 A | 1/1987 |
| JP | 2000241619 A * | 9/2000 |

(Continued)

OTHER PUBLICATIONS

International Search Report dated Aug. 18, 2020 in PCT/JP2020/025404 filed on Jun. 26, 2020, 3 pages.

*Primary Examiner* — Hoan C Nguyen
(74) *Attorney, Agent, or Firm* — Maier & Maier, PLLC

(57) ABSTRACT

According to one embodiment, a display device includes a first substrate and a second substrate. The first substrate includes a plurality of pixels and a plurality of color filters. The plurality of pixels include a first pixel and a second pixel that display an identical color. The second pixel is disposed in a diagonal direction relative to the first pixel. Each of a first color filter corresponding to the first pixel and a second color filter corresponding to the second pixel includes a first filter part formed at a position overlapping an opening of a pixel corresponding to the color filter in plan view, and a second filter part formed at a position overlapping a non-opening area of the pixel in plan view.

15 Claims, 17 Drawing Sheets

(56) References Cited

FOREIGN PATENT DOCUMENTS

| | | | |
|---|---|---|---|
| JP | 2001021715 A | * | 1/2001 |
| JP | 2002063848 A | * | 2/2002 |
| JP | 3329206 B2 | | 9/2002 |
| JP | 2004-341212 A | | 12/2004 |
| JP | 2005-258176 A | | 9/2005 |
| JP | 2006-251417 A | | 9/2006 |
| JP | 2006-293385 A | | 10/2006 |
| JP | 5255758 B2 | | 8/2013 |
| JP | 2017-044915 A | | 3/2017 |

* cited by examiner

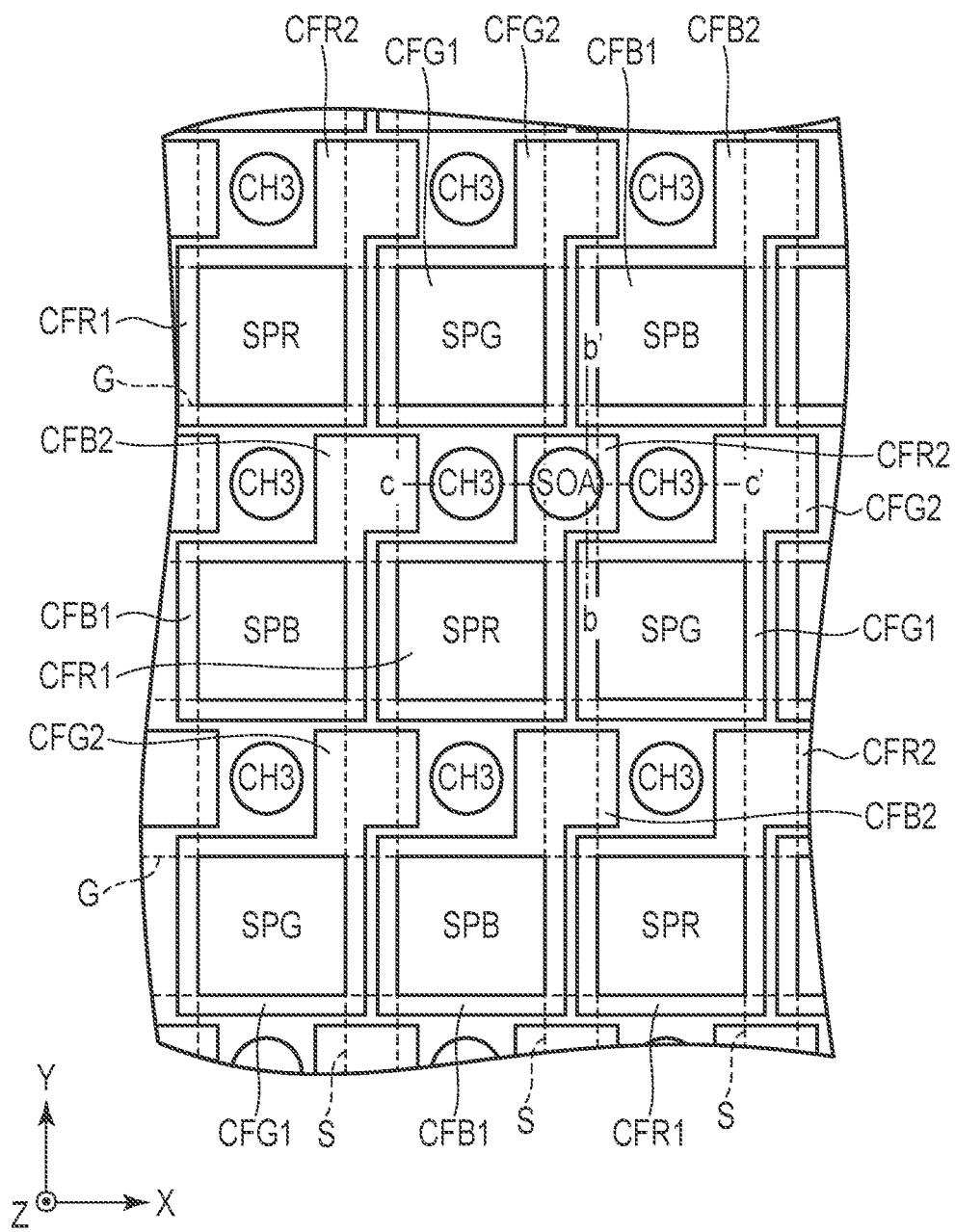
F I G. 5

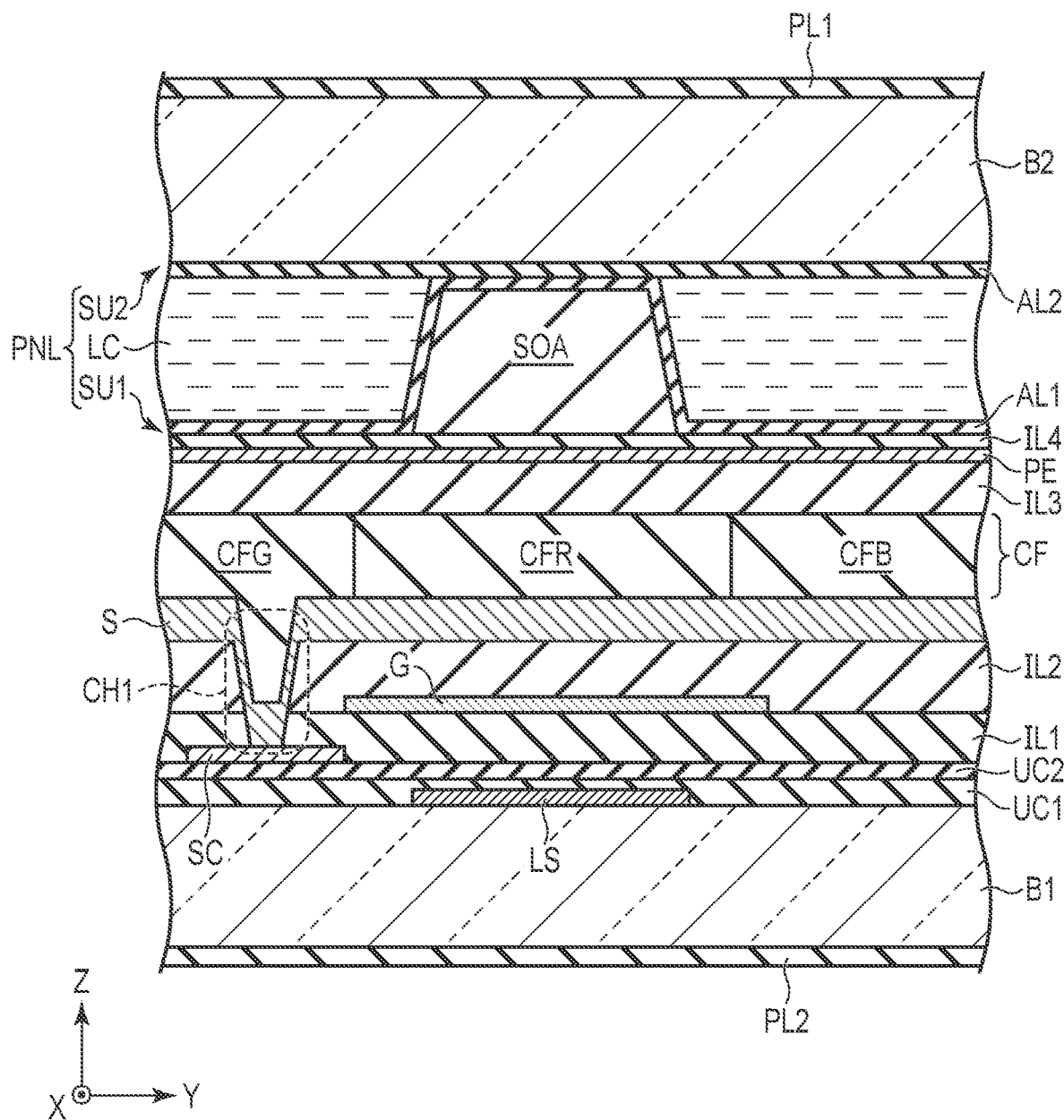
F I G. 6

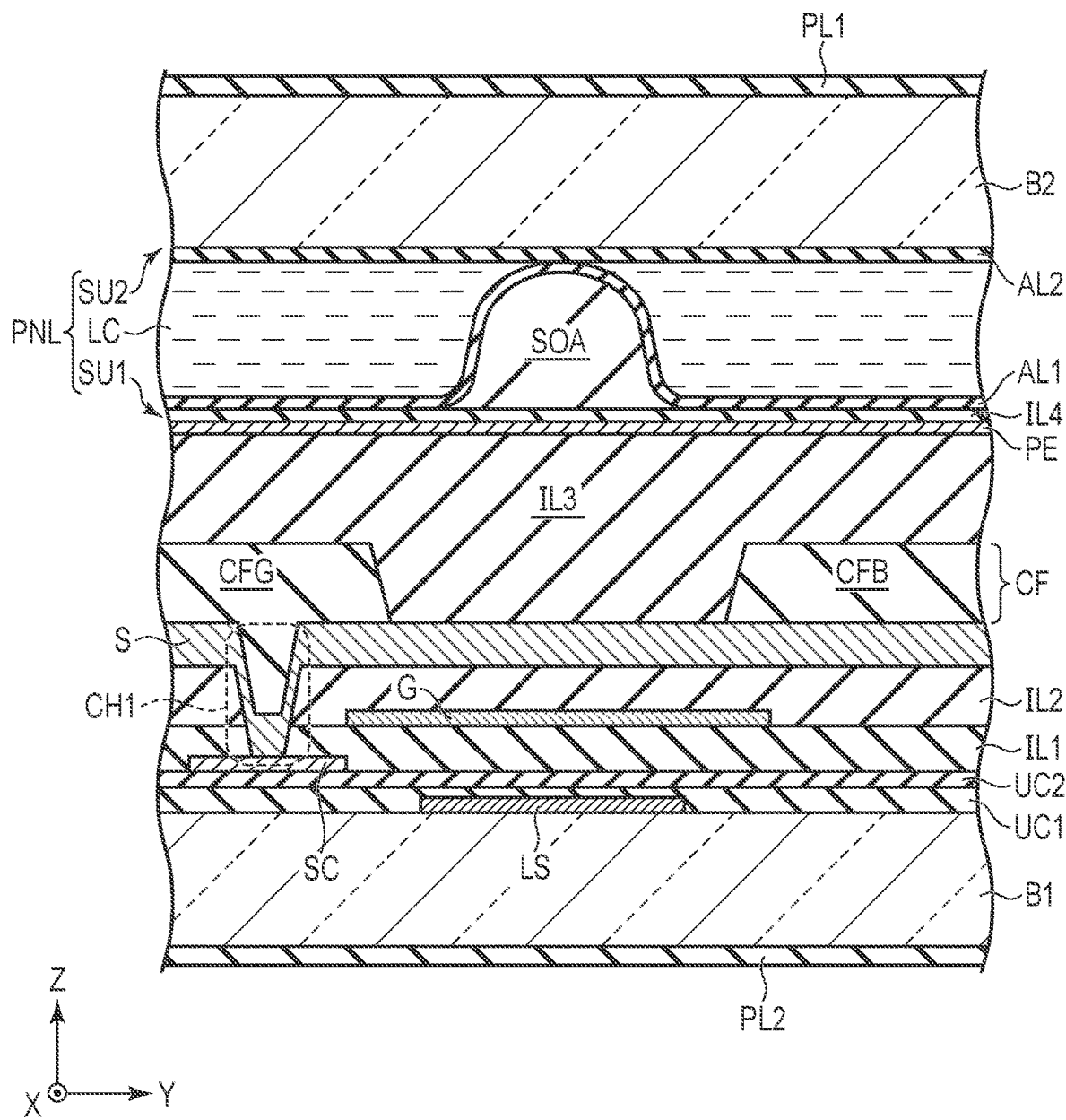
F I G. 12

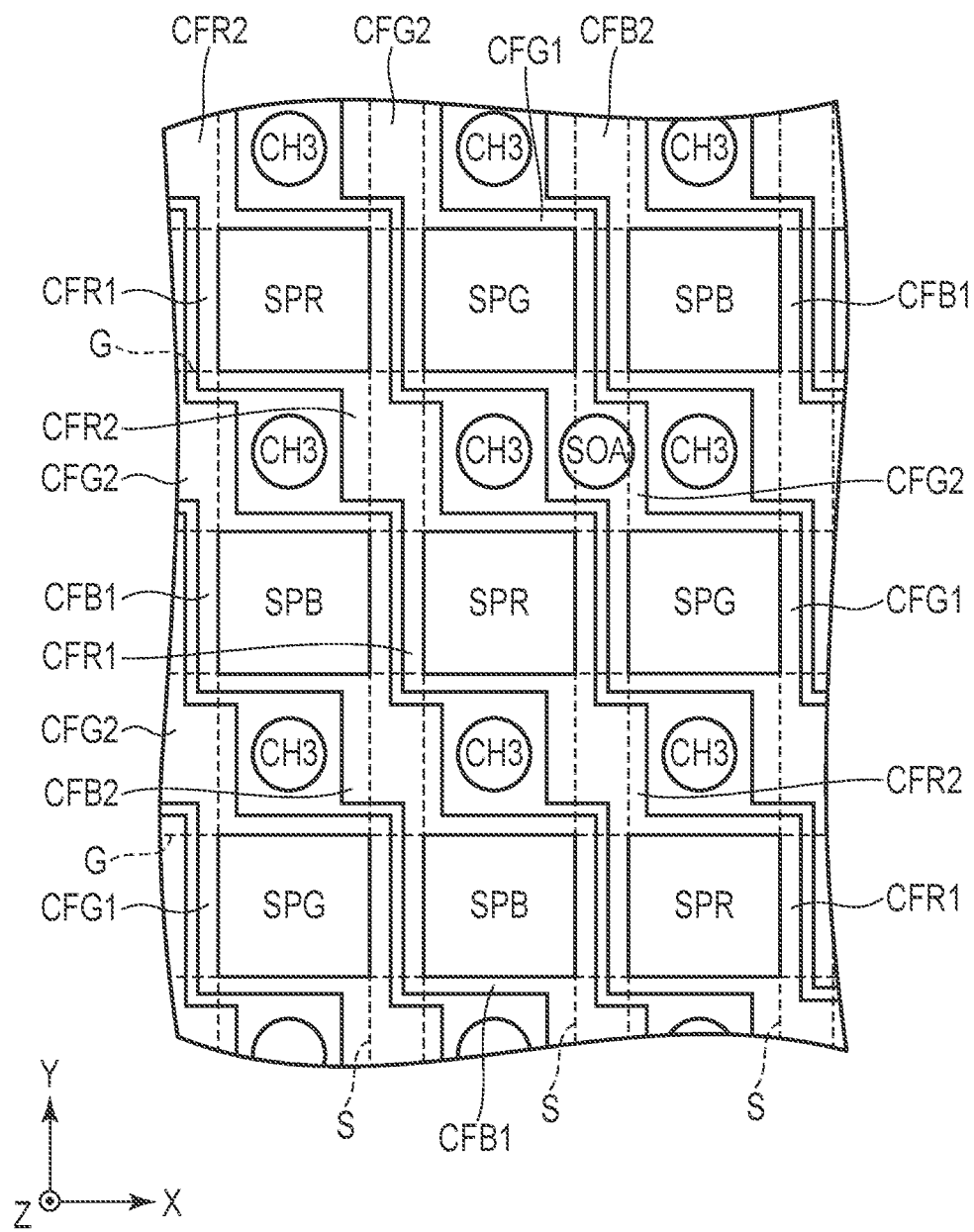
F I G. 14

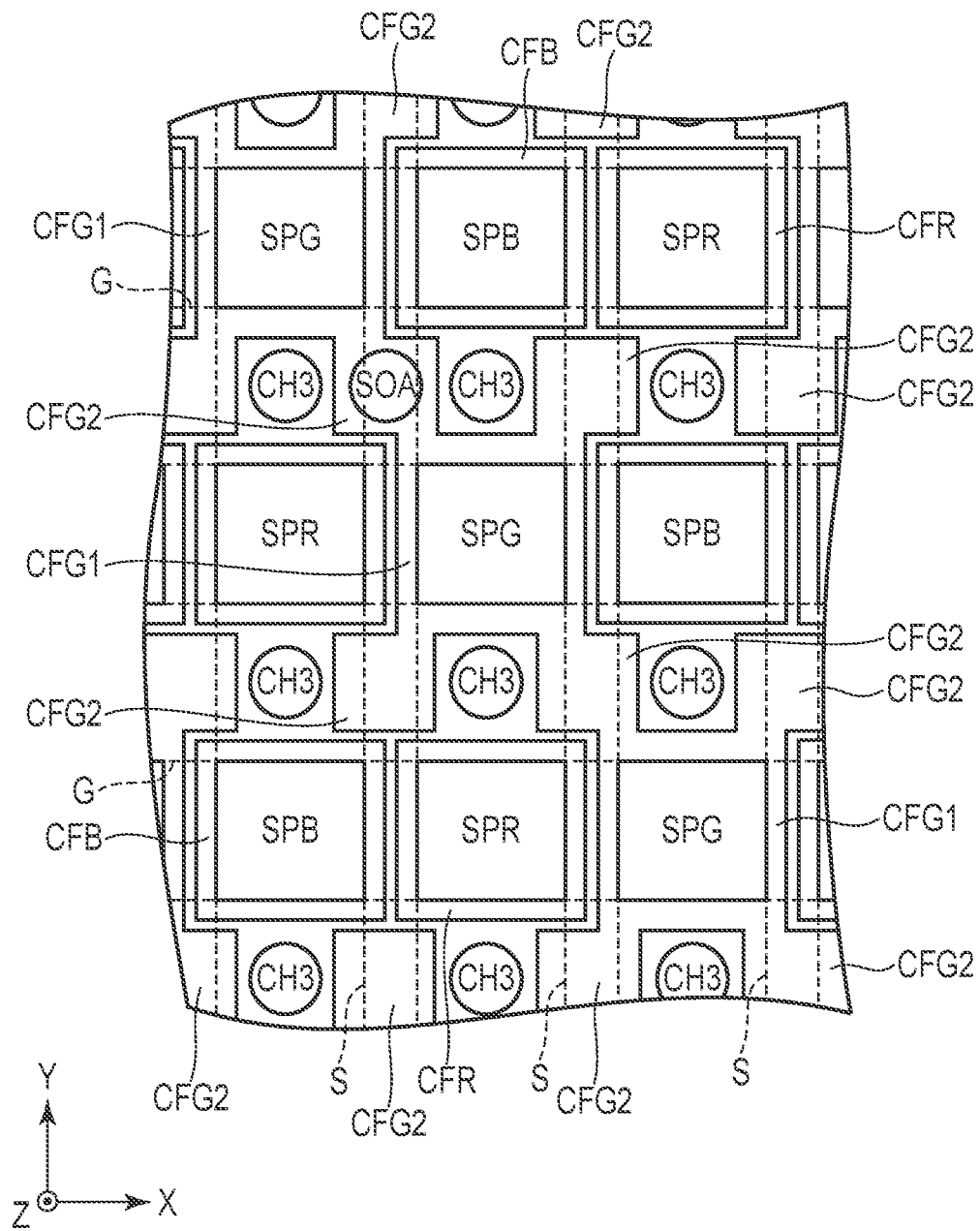
F I G. 15

DISPLAY DEVICE

CROSS-REFERENCE TO RELATED APPLICATIONS

This application is a Continuation Application of PCT Application No. PCT/JP2020/025404, filed Jun. 26, 2020 and based upon and claiming the benefit of priority from Japanese Patent Application No. 2019-141427, filed Jul. 31, 2019, the entire contents of all of which are incorporated herein by reference.

FIELD

Embodiments described herein relate generally to a display device.

BACKGROUND

As an example of a display device, a liquid crystal display device including a pair of substrates and a liquid crystal layer disposed between the pair of substrates is known. In a liquid crystal display device capable of color display, one of a pair of substrates is provided with a color filter.

The color filter, in many cases, is provided on a counter substrate different from an array substrate including switching elements and pixel electrodes. To solve a color mixing problem, however, the color filter may be provided on the array substrate in some cases.

The above configuration in which the color filter is provided on the array substrate may cause the display device a problem, depending on the shape of the color filter or other factors, leading to a decline in the reliability of the display device in some cases.

BRIEF DESCRIPTION OF THE DRAWINGS

FIG. 5 is a diagram for explaining the shape and arrangement of color filters.

FIG. 6 is a schematic cross-sectional view of the display panel, the cross-sectional view being taken along a b-b' line shown in FIG. 5.

FIG. 12 is a schematic cross-sectional view of a display panel of a third comparative example.

FIG. 14 depicts a first modification.

FIG. 15 depicts a second modification.

DETAILED DESCRIPTION

Figure 1:
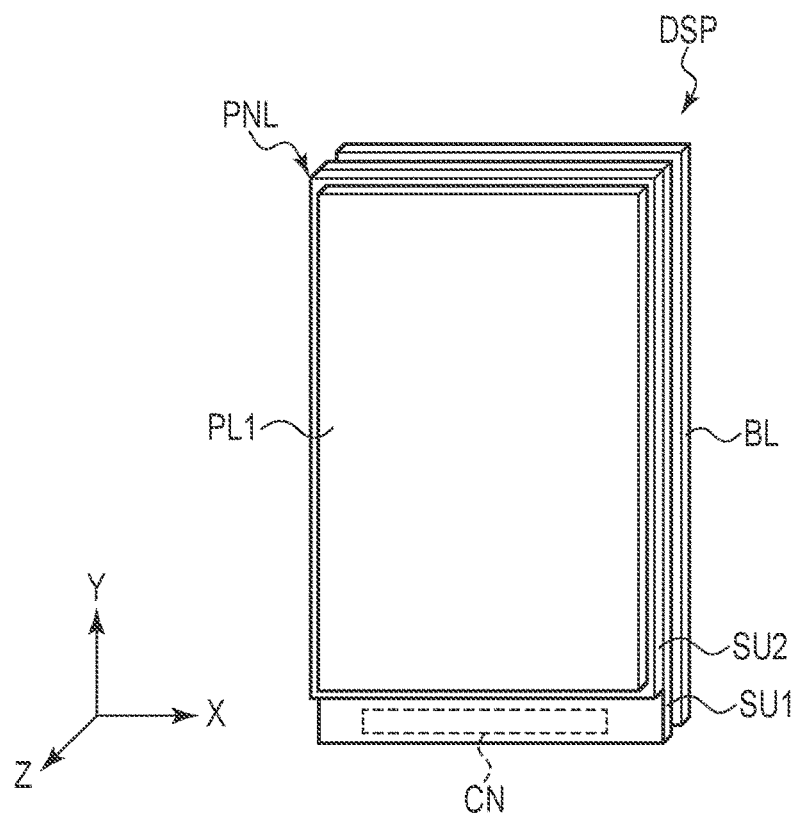
FIG. 1 is a perspective view showing an example of the appearance of a display device according to an embodiment.

In general, according to one embodiment, a display device includes a first substrate and a second substrate counter to the first substrate. The first substrate includes a plurality of pixels arranged on the first substrate, and a plurality of color filters corresponding to the plurality of pixels. The plurality of pixels are arranged in a first direction and a second direction in a matrix form and include a first pixel and a second pixel that display an identical color. The second pixel is disposed in a diagonal direction relative to the first pixel, the diagonal direction being diagonal to the first direction and the second direction. Each of a first color filter of the plurality of color filters, the first color filter corresponding to the first pixel, and a second color filter of the plurality of color filters, the second color filter corresponding to the second pixel, includes a first filter part formed at a position overlapping an opening of a pixel corresponding to the color filter in plan view, and a second filter part at least partially connected to the first filter part, the second filter part being formed at a position overlapping a non-opening area of the pixel in plan view.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

In an embodiment of the present invention, a transmissive liquid crystal display device is disclosed as an example of a display device. This display device can be used for various devices/equipment, such as virtual reality (VR) viewers, smartphones, tablet terminals, mobile phone terminals, personal computers, television receivers, in-vehicle equipment, game devices, and digital camera monitors.

It should be noted that this embodiment does not preclude applications to other types of display devices equipped with color filters. For example, at least some of configurations disclosed in this embodiment can also be applied to a reflective liquid crystal display device, a self-luminous display device including organic electroluminescence elements and micro LEDs, an electronic paper type display device including electrophoresis elements, a display device utilizing a micro-electromechanical system (MEMS), and a display device utilizing the electrochromism principle.

FIG. 1 is a perspective view showing an example of the appearance of a display device (liquid crystal display device) DSP according to this embodiment. In this embodiment, an X direction, a Y direction, and a Z direction are defined in such a manner as shown in FIG. 1. The X direction, the Y diction, and the Z direction are, for example, perpendicular to each other, but may intersect each other at non-right angels, that is, may be not perpendicular to each other. The direction indicated by an arrow pointing the Z direction may be referred to as "up or upward", and the direction opposite to that direction may be referred to as "don or downward". In addition, seeing the display device DSP and its components in a direction parallel with the Z direction is referred to as a plan view.

The display device DSP includes a display panel PNL, an illumination device BL (backlight), and a first polarizer PL1. The display panel PNL, the illumination device BL, and the first polarizer PL1 are stacked in the Z direction. A second polarizer, which will be described later, is disposed between the display panel PNL and the illumination device BL.

The display panel PNL includes a first substrate SU1 (array substrate) and a second substrate SU2 (counter substrate). A liquid crystal layer, which is not shown in FIG. 1 and will be described later, is disposed between the first substrate SU1 and the second substrate SU2. The first substrate SU1 includes a connector CN. The connector CN includes a terminal to which signal supply sources, such as a flexible circuit board and an IC chip, are connected.

The illumination device BL includes, for example, a light guide plate counter to the first substrate SU1, a light source disposed along the edge of the light guide plate, and an optical sheet, such as a prism sheet or a diffusion sheet, disposed between the light guide plate and the display panel PNL. The light source has, for example, a structure in which a phosphor is stacked on a blue light-emitting diode, and emits white light onto the light guide plate. It should be noted that the configuration of the light source is not limited to this configuration.

Figure 2:
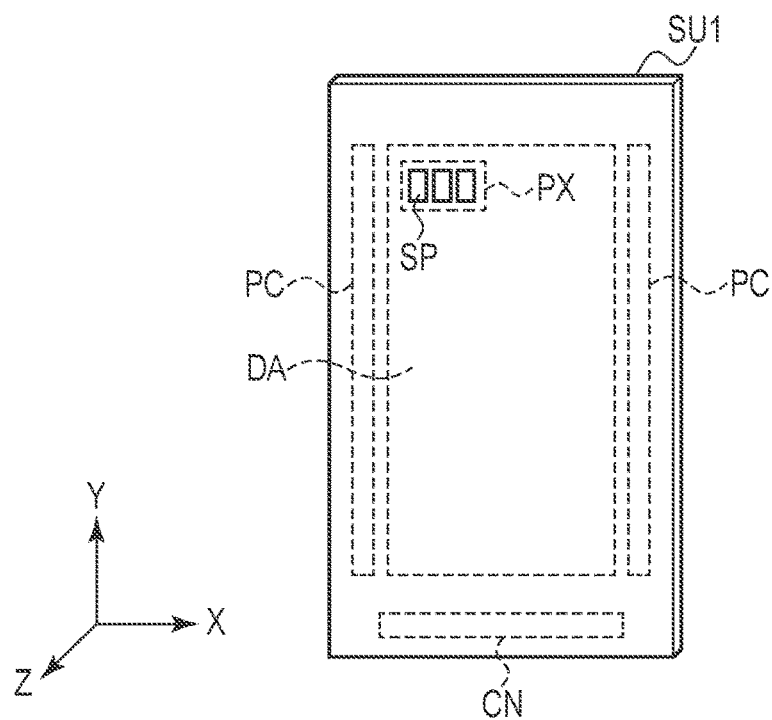
FIG. 2 is a perspective view schematically showing an example of a first substrate.

FIG. 2 is a perspective view schematically showing an example of the first substrate SU1. The first substrate SU1 includes a display area DA and a pair of drive circuits PC arranged outside the display area DA. The display area DA includes a large number of pixels PX arranged in the X direction and the Y direction in a matrix form. Each pixel PX includes, for example, a plurality of sub-pixels SP that display red, green, and blue. The pixel PX may include a sub-pixel SP that displays another color, such as white. The drive circuits PC each supply a signal (scanning signal that will be described later) for driving a sub-pixel SP.

Figure 3:
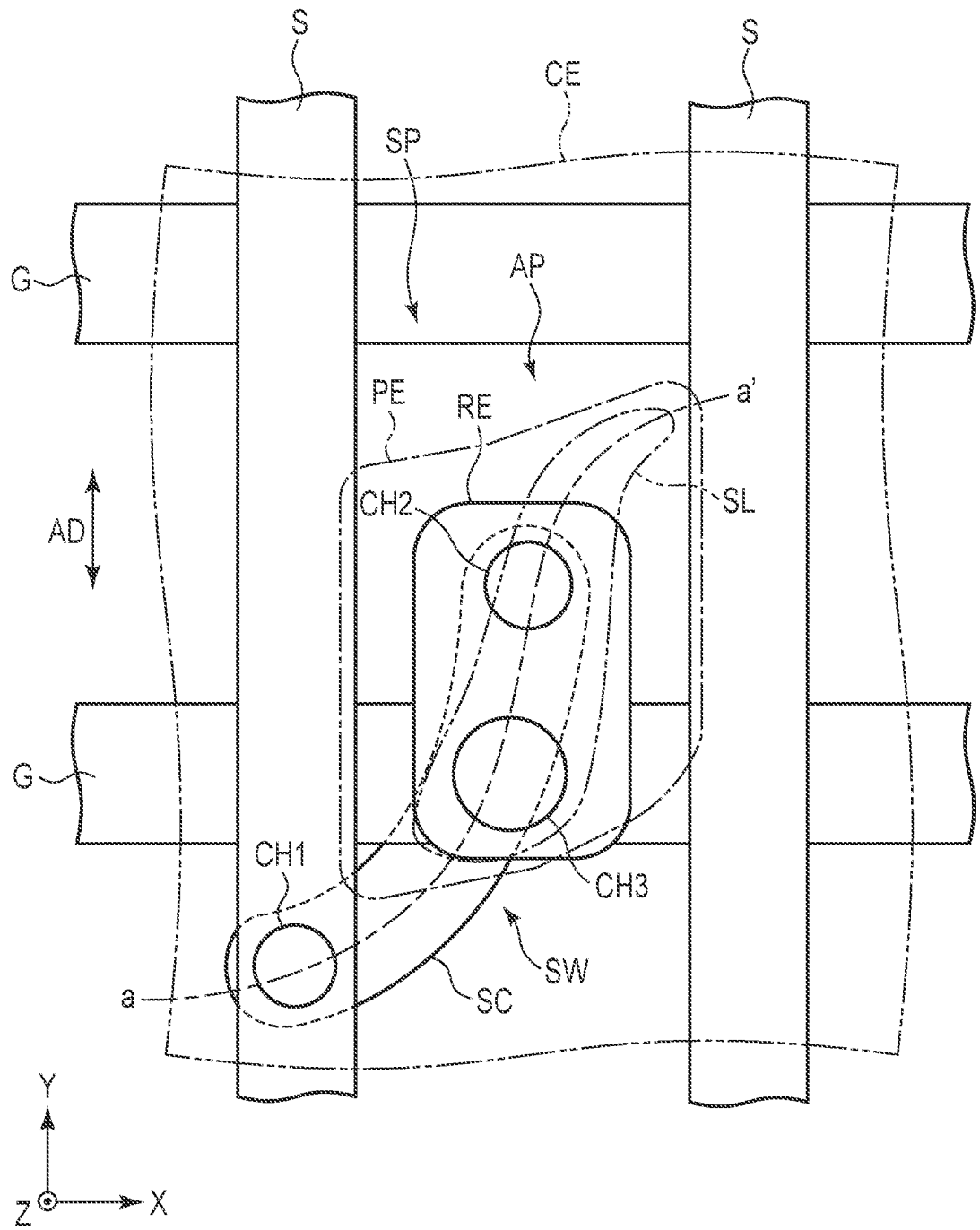
FIG. 3 is a plan view schematically showing an example of a sub-pixel.

FIG. 3 is a plan view schematically showing an example of the sub-pixel SP. The first substrate SU1 includes a plurality of scanning lines G and a plurality of signal lines S. The plurality of scanning lines G extend in the X direction and are lined up in the Y direction. The plurality of signal lines S extend in the Y direction and are lined up in the X direction. An area partitioned off by two adjacent scanning lines G and two adjacent signal lines S corresponds to an opening (opening area) AP of one sub-pixel SP.

The first substrate SU1 includes a pixel electrode PE, a switching element SW, and a relay electrode RE that are provided for each sub-pixel SP. The switching element SW includes a semiconductor layer SC. The semiconductor layer SC, the relay electrode RE, the pixel electrode PE, and a common electrode CE are stacked in this order in the Z direction. In FIG. 3, the pixel electrode PE and the common electrode CE are indicated by chain lines.

The signal line S and the semiconductor layer SC are in contact with each other through a first contact hole CH1. The semiconductor layer SC and the relay electrode RE are in contact with each other through a second contact hole CH2.

The relay electrode RE and the pixel electrode PE are in contact with each other through a third contact hole CH3.

Between the first contact hole CH1 and the second contact hole CH2, the semiconductor layer SC is curved in an arc shape and intersects a scanning line G once. In the example shown in FIG. 3, the semiconductor layer SC is located below the scanning line G. Meanwhile, the relay electrode RE, except a part thereof in the second contact hole CH2, is located above the scanning line G. The relay electrode RE is, for example, a rectangular shape with rounded corners, and overlaps both opening AP and scanning line G.

The pixel electrode PE is larger in area than the relay electrode RE, and overlaps most of the opening AP. In the example shown in FIG. 3, the pixel electrode PE overlaps the scanning line G on the lower side in FIG. 3 (the scanning line G intersecting the semiconductor layer SC of the sub-pixel SP) but does not overlap the scanning line G on the upper side in FIG. 3.

The common electrode CE has a slit SL in each sub-pixel SP. In FIG. 3, only the slit SL of one sub-pixel SP is illustrated and the slit SL of another sub-pixel SP adjacent to the one sub-pixel SP is not illustrated. At least a part of the slit SL is curved along the direction of a diagonal of the sub-pixel SP. The slit SL as a whole overlaps the pixel electrode PE. In the example shown in FIG. 3, the slit SL overlaps the scanning line G on the lower side in FIG. 3 (the scanning line G intersecting the semiconductor layer SC of the sub-pixel SP) but does not overlap the scanning line G on the upper side in FIG. 3 and not overlap the signal lines S, either. The slit SL overlaps the second contact hole CH2 and the third contact hole CH3, and overlaps also the semiconductor layer SC in the opening AP.

The second contact hole CH2 is located in the opening AP, and overlaps the pixel electrode PE and the slit SL. Third contact hole CH3 overlaps the semiconductor layer SC, the scanning line G, and the slit SL. To put it another way, the third contact hole CH3 overlaps an area where the scanning line G and the semiconductor layer SC intersect.

It should be noted that the shapes of the semiconductor layer SC, the relay electrode RE, the pixel electrode PE, and the slit SL are not limited to those shown in FIG. 3, and various different shapes may be adopted as their shapes. Also, the positions of the first contact hole CH1, the second contact hole CH2, and the third contact hole CH3 may be changed properly.

A common voltage is applied to the common electrode CE. When a scanning signal is supplied to the scanning line G, it turns the switching element SW on, and a video signal supplied to the signal line S is applied to the pixel electrode PE via the relay electrode RE. At this time, an electric field is generated between the pixel electrode PE and the common electrode CE in the vicinity of the slit SL.

In a state in which such an electric field is not generated, liquid crystal molecules included in a liquid crystal layer disposed between the first substrate SU1 and the second substrate SU2 are aligned such that major axes are parallel with an initial alignment direction AD. The liquid crystal molecules have, for example, positive dielectric anisotropy, because of which, when the electric field acts on the liquid crystal layer, the liquid crystal molecules rotate such that their major axes face the direction of the electric field. A part where the pixel electrode PE and the common electrode CE overlap functions as a holding capacitor that maintains the alignment state of the liquid crystal molecules during a period in which the switching element SW is turned off.

In the example shown in FIG. 3, the initial alignment direction AD is parallel with the Y direction. The initial alignment direction AD is, however, not limited to the direction shown in this example. The liquid crystal layer LC may contain liquid crystal molecules having negative dielectric anisotropy. When the liquid crystal layer LC contains liquid crystal molecules having negative dielectric anisotropy, the initial alignment direction AD matches the X direction. Liquid crystal molecules having positive dielectric anisotropy are superior in response performance to liquid crystal molecules having negative dielectric anisotropy, and are suitable for use in VR viewers.

Figure 4:
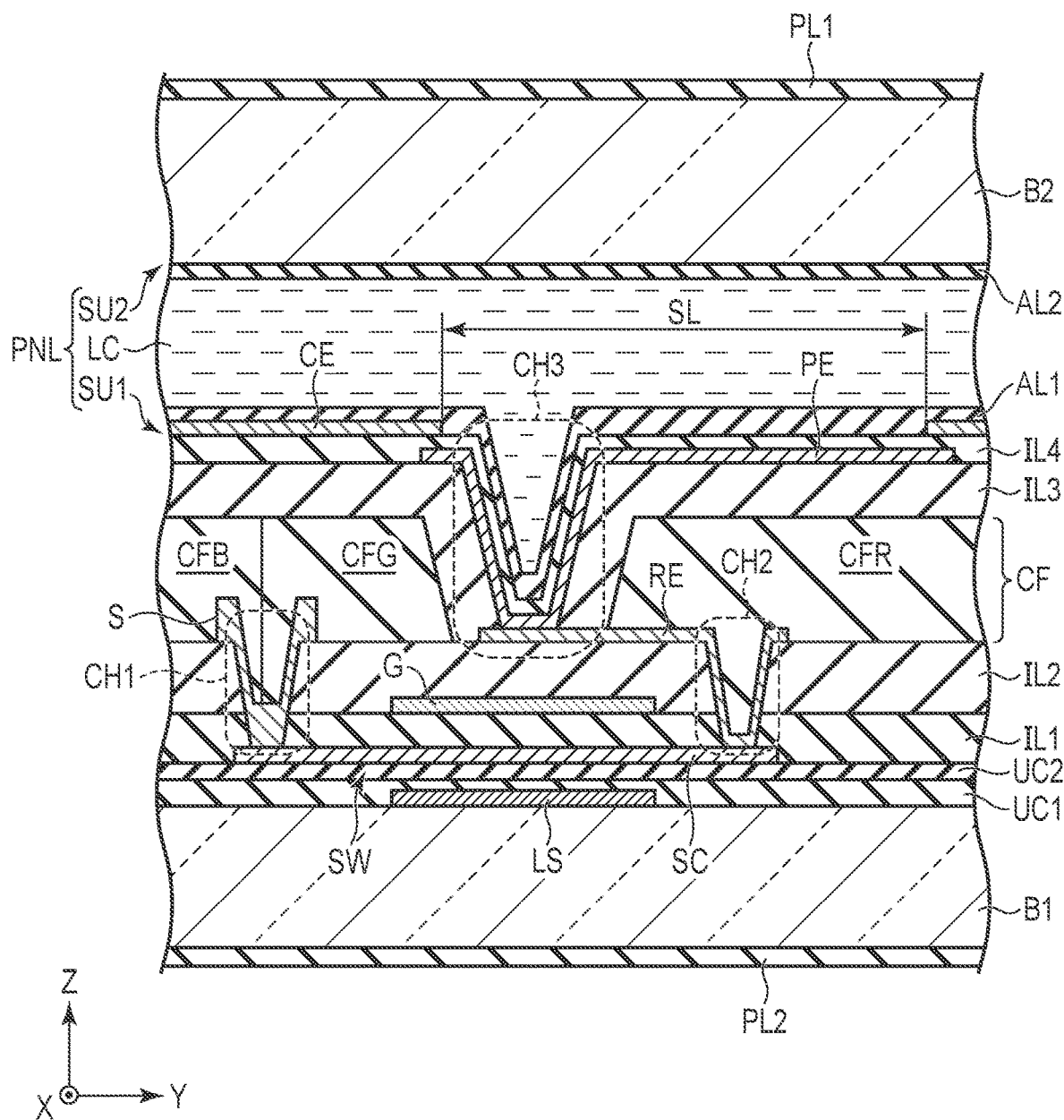
FIG. 4 is a schematic cross-sectional view of a display panel, the cross-sectional view being taken along an a-a' curve shown in FIG. 3.

FIG. 4 is a schematic cross-sectional view of the display panel PNL, the cross-sectional view being taken along an a-a' curve shown in FIG. 3. As described above, the first substrate SU1 includes the semiconductor layer SC, the scanning lines G, the signal lines S, the relay electrodes RE, the pixel electrodes PE, and the common electrode CE. The first substrate SU1 further includes a first base material B1, a light-shielding layer LS, a first undercoat layer UC1, a second undercoat layer UC2, a first insulating layer IL1, a second insulating layer IL2, a third insulating layer IL3 (flattening layer), a fourth insulating layer IL4, a color filter layer CF, and a first alignment film AL1.

The light-shielding layer LS is provided on an upper surface of the first base material B1. The first undercoat layer UC1 covers the upper surfaces of the light-shielding layer LS and the first base material B1. The second undercoat layer UC2 covers the first undercoat layer UC1. The semiconductor layer SC is provided on the second undercoat layer UC2. The area where the semiconductor layer SC and the scanning line G intersect is counter to the light-shielding layer LS. The first insulating layer IL1 covers the semiconductor layer SC and the second undercoat layer UC2. The scanning line G is provided on the first insulating layer IL1. The second insulating layer IL2 covers the scanning line G and the first insulating layer IL1.

The signal line S and the relay electrode RE are provided on the second insulating layer IL2. The color filter layer CF covers the signal line S, the relay electrode RE, and the second insulating layer IL2. The third insulating layer IL3 covers the relay electrode RE, the second insulating layer IL2, and the color filter layer CF. The pixel electrode PE is provided on the third insulating layer IL3. The fourth insulating layer IL4 covers the pixel electrode PE and the third insulating layer IL3. The common electrode CE is provided on the fourth insulating layer IL4, and extends over a plurality of sub-pixels SP. The common electrode CE has the above-described slit SL. The first alignment film AL1 covers the common electrode CE and the fourth insulating layer IL4.

The second substrate SU2 includes a second base material B2 and a second alignment film AL2. The second alignment film AL2 covers a lower surface of the second base material B2. The above-described liquid crystal layer LC is disposed between the first alignment film AL1 and the second alignment film AL2.

The first polarizer PL1 is disposed on an upper surface of the second base material B2. The second polarizer PL2 is disposed on a lower surface of the first base material B1. The absorption axis of the first polarizer PL1 and that of the second polarizer PL2 are orthogonal to each other. For example, the absorption axis of the first polarizer PL1 is parallel with the above-described initial alignment direction AD, in which case the display device DSP of a normally black type can be obtained.

The first base material B1 and the second base material B2 are each made of, for example, a layer of borosilicate glass of about 0.2 mm in thickness, but may be made of a resin, such as polyimide. The first alignment film AL1 and the second alignment film AL2 are, for example, polyimide films subjected to a photo-alignment treatment, but may be polyimide films subjected to a rubbing alignment treatment. These first alignment film AL1 and second alignment film AL2 align liquid crystal molecules in the above-descried initial alignment direction AD.

The first undercoat layer UC1 is, for example, a silicon oxide film. The second undercoat layer UC2 is, for example, a silicon nitride film. The first insulating layer IL1 is, for example, a silicon oxide film. The second insulating layer IL2 is, for example, a silicon nitride film. The third insulating layer IL3 is formed, using a transparent positive photoresist. The fourth insulating layer IL4 is, for example, a silicon nitride film created by low-temperature film deposition.

In the color filter layer CF, a plurality of color filters corresponding respectively to a plurality of sub-pixels SP are arranged. Specifically, the plurality of color filters arranged in the color filter layer CF includes a color filter CFR corresponding to a sub-pixel SP displaying red, a green color filter CFG corresponding to a sub-pixel SP displaying green, and a blue color filter CFB corresponding to a sub-pixel SP displaying blue. The color filter CFR is disposed at a position overlapping the sub-pixel SP displaying red, the color filter CFG is disposed at a position overlapping the sub-pixel SP displaying green, and the color filter CFB is disposed at a position overlapping the sub-pixel SP displaying blue.

The color filters CFR, CFG, and CFB are formed from negative photoresists containing red, green, and blue pigments, respectively.

The relay electrode RE, the pixel electrode PE, and the common electrode CE are each made of, for example, a transparent conductive material, such as an indium tin oxide (ITO). The scanning line G and the light-shielding layer LS are each made of, for example, a molybdenum-tungsten alloy. The signal line S has a three-layer structure including, for example, layers of titanium, aluminum, and titanium that are stacked in order. The semiconductor layer SC is, for example, a metal oxide semiconductor containing indium zinc oxide (IZO).

It should be noted that elements making up the first substrate SU1 and the second substrate SU2 can be formed of various materials that are not limited to the materials exemplified above. For example, the semiconductor layer SC is not limited to an oxide semiconductor, and may be made of polysilicon or amorphous silicon.

The first contact hole CH1 and the second contact hole CH2 both penetrate the first insulating layer IL1 and the second insulating layer IL2. The third contact hole CH3 penetrates the third insulating layer IL3. The signal line S is in contact with the semiconductor layer SC through the first contact hole CH1. The relay electrode RE is in contact with the semiconductor layer SC through the second contact hole CH2. The pixel electrode PE is in contact with the relay electrode RE through the third contact hole CH3.

The structure of the display panel PNL is not limited to the structure shown in the example of FIG. 4. In the example shown in FIG. 4, the common electrode CE is located between the pixel electrode PE and the liquid crystal layer LC. However, for example, the pixel electrode PE and the common electrode CE may be included in the same layer, or the pixel electrode PE may be disposed between the liquid crystal layer LC and the common electrode CE. The common electrode CE may be disposed on the second substrate SU2. The first substrate SU1 or the second substrate SU2 may include a light-shielding layer other than the light-shielding layer LS, the scanning line G, and the signal line S. In addition to these, the display panel PNL may be modified into various structures.

Now, the display device DSP according to this embodiment has a configuration of color filter on array (COA) type in which the color filters CFR, CFG, and CFB are formed on the same substrate (array substrate) on which the switching element SW (active element) is formed. In this case, the color filters CFR, CFG, and CFB are formed between the switching element SW and the liquid crystal layer LC in order to ensure a color mixing suppression effect. As a result, the third contact hole CH3 for connecting the pixel electrode PE to the switching element is formed in such a way as to penetrate the third insulating layer IL3 and the color filter layer CF. Color mixing refers to a phenomenon that at display of a pure color, its hue changes in a horizontally asymmetrical manner, especially changes widely on either the left or the right side. It is the phenomenon that is peculiar to an in-plane switching (IPS) system, which is characterized by its wide viewing angle, and to a fringe field switching (FFS) system, which is a type of the IPS system.

The sectional shape of the color filter layer CF (color filters CFR, CFG, and CFB) varies, depending on colors to display. For this reason, according to this embodiment, the third contact hole CH3 is not directly formed on the color filter layer CF, and respective gaps between adjacent color filters CFR, CFG, and CFB are each filled with the third insulating layer IL3, on which the third contact hole CH3 is formed.

In the case of such a configuration, however, the size of the third contact hole CH3 becomes excessively large or the surface shape of the third insulating film layer IL3, which serves as the substratum of a spacer SOA, is not flat. This leads to a case where the holding function of the spacer SOA becomes insufficient or the color filters CFR, CFG, and CFB are easy to peel off, thus leading to a problem caused by peeling of the color filters CFR, CFG, or CFB, which raises a possibility that the reliability of the display device DSP may decline.

As shown in FIG. 4, the thickness of a layer given by combining the color filter layer CF and the third insulating layer IL3 together is larger than the thickness of a layer given by combining the first insulating layer IL1 and the second insulating layer IL2 together. In this case, the third contact hole CH3 is formed to be deeper than the first contact hole CH1 and the second contact hole CH2. In this case, in a plan view, the diameter of the third contact hole CH3 is larger than respective dimeters of the first contact hole CH1 and the second contact hole CH2.

This means that to achieve a high aperture ratio in the display device DSP according to this embodiment, miniaturizing the third contact hole CH3 is essential. Specifically, since the third contact hole CH3 directly penetrates the third insulating layer IL3 covering the color filter layer CF, miniaturizing the third contact hole CH3 requires reducing the film thickness of the third insulating layer IL3.

Besides, although it is not shown in FIG. 4, the spacer (spacer on array or SOA) is disposed between the first substrate SU1 and the second substrate SU2, as a holding member that holds a gap between the first substrate SU1 and the second substrate SU2, in which gap the liquid crystal layer LC is formed. The spacer is used, for example, to make the thickness (cell gap) of the liquid crystal layer LC uniform, and the third insulating layer IL3 (flattening layer) is formed to flatten a substratum on which the spacer is laid. In other words, to allow the spacer to stably hold the liquid crystal layer LC, the top of the spacer needs to be made flat. To make the top of the spacer flat, the substratum of the spacer (i.e., the third insulating layer IL3) needs to be flat.

The display device DSP according to this embodiment has a configuration that meets the requirement for preventing peeling of the color filters CFR, CFG, and CFB, for reducing the film thickness of the third insulating layer IL3, and for flattening the substratum of the spacer all at once.

FIG. 5 is a diagram for explaining the shape and arrangement of the color filters CFR, CFG, and CFB according to this embodiment. The color filters CFR, CFG, and CFB are formed in such a way as to correspond to the sub-pixel SPR displaying red, the sub-pixel SPG displaying green, and the sub-pixel SPB displaying blue, respectively. The sub-pixels SPR, SPG, and SPB shown in FIG. 5 each represent the opening (opening area) of each sub-pixel SP partitioned off by scanning lines G and signal lines S.

Each color filter CFR shown in FIG. 5, for example, includes two island structures of small one and larger one. Specifically, the color filter CFR includes a first filter part CFR1 formed at a position overlapping the opening of the sub-pixel SPR in plan view, and a second filter part CFR2 (second filter part) that is at least partially connected to the first filter part CFR1 and that is formed at a position overlapping a non-opening area (i.e., an area other than the opening) of the sub-pixel SPR in plan view. Specifically, the second filter part CFR2 is formed at a position overlapping an area where the scanning line G and the signal line S intersect.

The first filter part CFR1 and the second filter part CFR2 each have a rectangular shape, and the second filter part CFR2 is smaller in area than the first filter part CFR1. However, both or one of the two large and small island structures may be a non-rectangular shape, such as a rectangular shape with its corners rounded, a polygonal island structure, or a circular island structure.

In the example shown in FIG. 5, all color filters CFR corresponding respectively to a plurality of sub-pixels SPR are each formed into a planar shape including the first filter part CFR1 and the second filter part CFR2.

In this embodiment, the plurality of sub-pixels SPR (color filters CFR) are adjacent to each other in a diagonal direction relative to the X direction and the Y direction in which the plurality of sub-pixels SP (pixels PX) are arranged. It should be noted that the direction in which the plurality of sub-pixels SPR are adjacent to each other corresponds to, for example, a direction in which respective centers of the openings (first filter parts CFR1) of the plurality of sub-pixels SPR are lined up. In the example shown in FIG. 5, the plurality of sub-pixels SPR are adjacent to (continuous with) each other on a line extending from the upper left side to the lower right side.

The second filter parts CFR2 included in the color filters CFR are not lined up on the above line along the diagonal direction in which the plurality of sub-pixels SPR are adjacent to each other (but are formed at positions outside the line). In other words, a direction in which the first filter part CFR1 and the second filter part CFR2 are connected in one color filter CFR is different from the direction in which the plurality of sub-pixels SPR are adjacent to each other. In the example shown in FIG. 5, while the plurality of sub-pixels SPR are, as described above, adjacent to each other in the direction of heading from the upper left side to the lower right side, the second filter part CFR2 included in each color filter CFR is connected in a direction in which the second filter part CFR2 is on the right upper side (stands on the right upper side next) to the first filter part CFR1 and is connected thereto.

The color filter CFR has been described here. The other color filters CFG and CFB each have the same planar shape as the color filter CFR has, and are arranged in the same manner as the color filters CFR are. The plurality of color filters CFG each include a first filter part CFG1 and a second filter part CFG2, and the plurality of color filters CFB each include a first filter part CFB1 and a second filter part CFB2.

In this embodiment, the spacers SOA are each formed, for example, into a columnar shape, and are disposed at positions overlapping the second filter parts CFR2, CFG2, and CFB2 included in the color filters CFR, CFG, and CFB, respectively. It should be noted that the spacers SOA do not need to be disposed at all of the positions overlapping the second filter parts CFR2, CFG2, and CFB2, respectively, and may be disposed at some positions where the spacers SOA can properly hold the gap (i.e., can prevent a problem with the gap) between the first substrate SU1 and the second substrate SU2 between which the liquid crystal layer LC is formed. FIG. 5 shows an example in which the spacer SOA is disposed at a position overlapping one second filter part CFR2.

Each third contact hole CH3 is formed between the second filter parts included in the color filters corresponding respectively to two sub-pixels SP adjacent to each other in the X direction. In other words, the third contact hole CH3 is formed in a gap surrounded by the color filters CFR, CFG, and CFB (two large island structures and two small island structures).

In FIG. 5, in addition to the gap in which the third contact hole CH3 is formed, a given gap is formed also between the color filters CFR, CFG, and CFB. Except the part where the gap for the third contact hole CH3 is formed, however, the color filters CFR, CFG, and CFB may be in close contact with each other.

FIG. 6 is a schematic cross-sectional view of the display panel PNL, the cross-sectional view including the spacer SOA shown in FIG. 5 and being taken along a b-b' line parallel with the signal line S. In FIG. 6, the same components as those in FIG. 4 are denoted by the same reference sings, and detailed description thereof will be omitted.

As shown in FIG. 6, the spacer SOA is disposed at a position overlapping the color filter CFR (the second filter part CFR2 included in the color filter CFR).

Specifically, in this embodiment, forming the third insulating layer IL3 on the second filter part CFR2 included in the color filter CFR flattens the substratum of the spacer SOA, and disposing the spacer SOA on the flattened substratum makes the top of the spacer SOA flat.

According to this configuration, the area of the top of the spacer SOA (i.e., the area in contact with the second substrate SU2) can be increased. As a result, the spacer SOA of a trapezoidal shape shown in FIG. 6 is provided, which can properly hold the gap in which the liquid crystal layer LC is formed.

Figure 7:
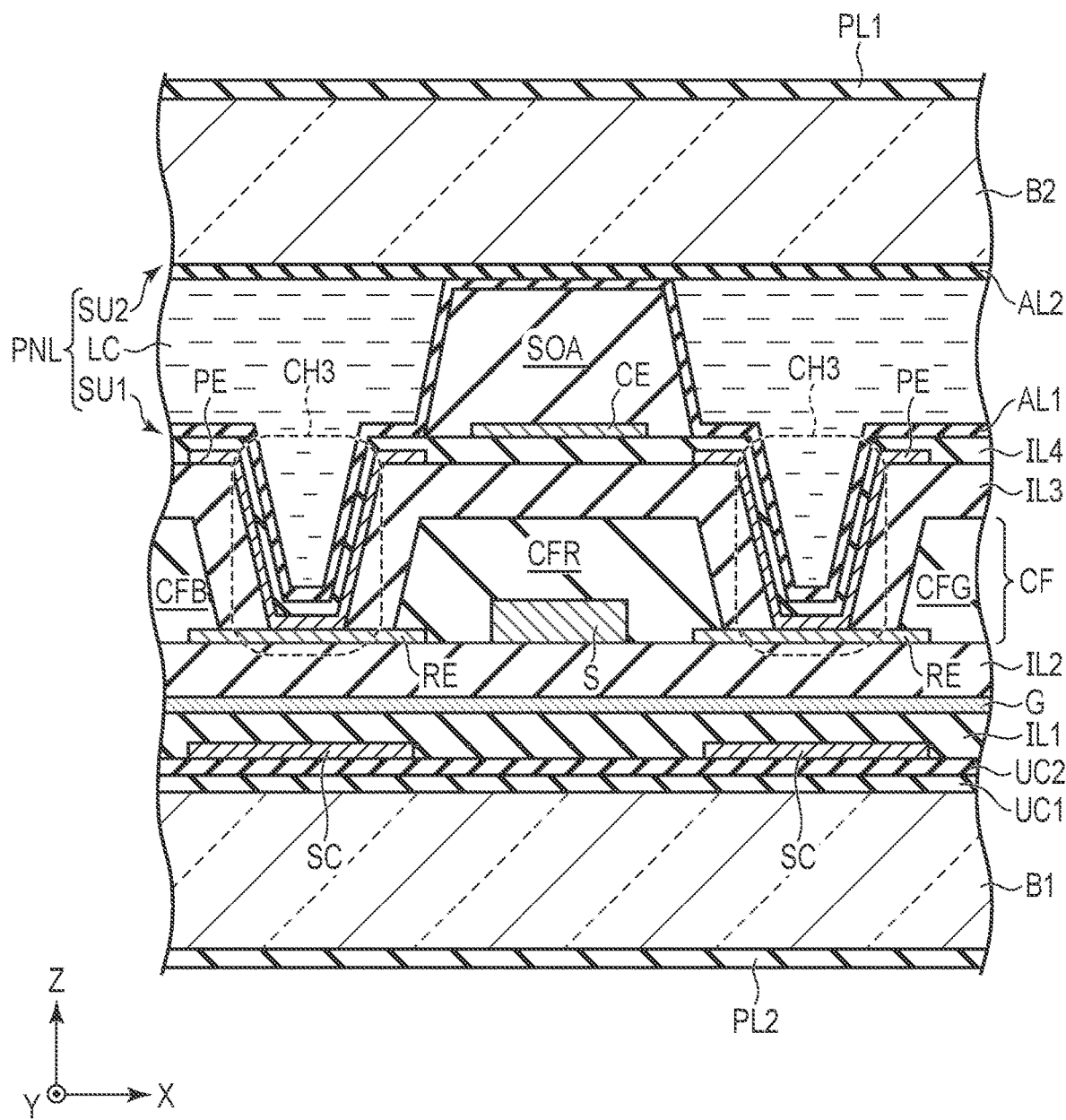
FIG. 7 is a schematic cross-sectional view of the display panel, the cross-sectional view being taken along a c-c' line shown in FIG. 5.

FIG. 7 is a schematic cross-sectional view of the display panel PNL, the cross-sectional view including the spacer SOA and the third contact hole CH3 shown in FIG. 5 and being taken along a c-c' line parallel with the scanning line G. In FIG. 7, the same components as those in FIG. 4 are denoted by the same reference sings, and detailed description thereof will be omitted.

In FIG. 7, two third contact holes CH3 are formed near the spacer SOA. A third contact hole CH3 on the left side of the spacer SOA shown in FIG. 7 is a contact hole formed between a second filter part CFR2 formed at a position overlapping the spacer SOA shown in FIG. 5 and a second filter part CFB2 included in a color filter CFB located on the left side of the color filter CFR including the second filter part CFR2. A third contact hole CH3 on the right side of the spacer SOA shown in FIG. 7, on the other hand, is a contact hole formed between the second filter part CFR2 formed at the position overlapping the spacer SOA shown in FIG. 5 and a second filter part CFG2 included in a color filter CFG located on the right side of the color filter CFR including the second filter part CFR2.

In this embodiment, because an upper part of the third insulating layer IL3 is sufficiently flattened before a stage of formation of the third contact holes CH3, each third contact hole CH3 can be formed in such a way as to have an inverted trapezoidal section, as shown in FIG. 7. By forming the section of the third contact hole CH3 into the inverted trapezoidal shape in this manner, a space between the third contact holes CH3 (i.e., a surface on which the spacer SOA is disposed) can also be properly flattened.

The diameter of the top of third contact hole CH3 is, for example, 3.1 μm, and the diameter of the bottom of the same is, for example, 1.8 μm. Such a third contact hole CH3 is sufficiently small one, which does not affect the opening of each sub-pixel SP.

The color filter layer CF (color filters CFR, CFG, and CFB) is formed of, for example, a negative photoresist that is a mixture of an acrylic resin and a pigment. The acrylic resin absorbs i-ray and photopolymerizes. The color filter CFG, however, has low i-ray transmittance because of light absorption by a green pigment. The color filters CFR and CFB, on the other hand, have high i-ray transmittance. For this reason, compared with the color filters CFR and CFB, the color filter CFG is easy to peel off.

In an assumed case, for example, where the color filters CFR and CFB are formed first and then the color filter CFG is formed following the formation of the color filters CFR and CFB, light does not reach the bottom on a part where the film thickness increases because of the color filter CFG overlapping the color filters CFR and CFB. This causes peeling of the color filter CFG.

To avoid such a problem, according to this embodiment, the color filter CFG is formed first and then the color filters CFR and CFB are formed in order. In this case, even if the color filters CFR and CFB overlapping the color filter CFG, which is formed first, increases the film thickness (that is, the color filters CFR and CFB are patterned in the second and subsequent layers), the possibility of occurrence of filter's peeling off is low because the color filters CFR and CFB have the high i-ray transmittance (which allows light to reach the bottom). The order in which the color filters CFR and CFB are formed is selectable; the color filter CFR may be formed first or the color filter CFB may be formed first.

Because, as mentioned above, the color filters CFR and CFB have the high i-ray transmittance, forming the color filters CFR and CFB is likely to involve production of residues. However, ensuring a sufficient developing time during the formation of the color filters CFR and CFB may prevent production of residues.

As described above, in this embodiment, each of the color filters CFR, CFG, and CFB has the planar shape that includes the first filter part formed at the position overlapping the opening of the sub-pixel SP corresponding to the color filter in a plan view, and the second filter part that is at least partially connected to the first filter part and that is formed at the position overlapping the non-opening area of the sub-pixel SP in a plan view. The first filter part and the second filter part each have the rectangular shape, and the second filter part is smaller in area than the first filter part. The second filter part is formed at the position overlapping the area where the scanning line G supplied with a scanning signal and the signal line S supplied with a video signal intersect.

In this embodiment, as described above, the color filters CFR, CFG, and CFB are each formed into the shape in which two large and small rectangular parts (two large and small island structures) are connected together. As a result, for example, compared with a configuration shown in FIG. 8 in which the color filters CFR, CFG, and CFB each have a single island structure (which configuration will hereinafter be referred to as "first comparative example"), the area of each of the color filters CFR, CFG, and CFB can be made larger, in which case filter's peeling hardly occurs. Hence, according to this embodiment, a problem with the display device DSP caused by peeling of the color filter CFR, CFG, or CFB is avoided to prevent a decline in the reliability of the display device DSP.

Figure 8:
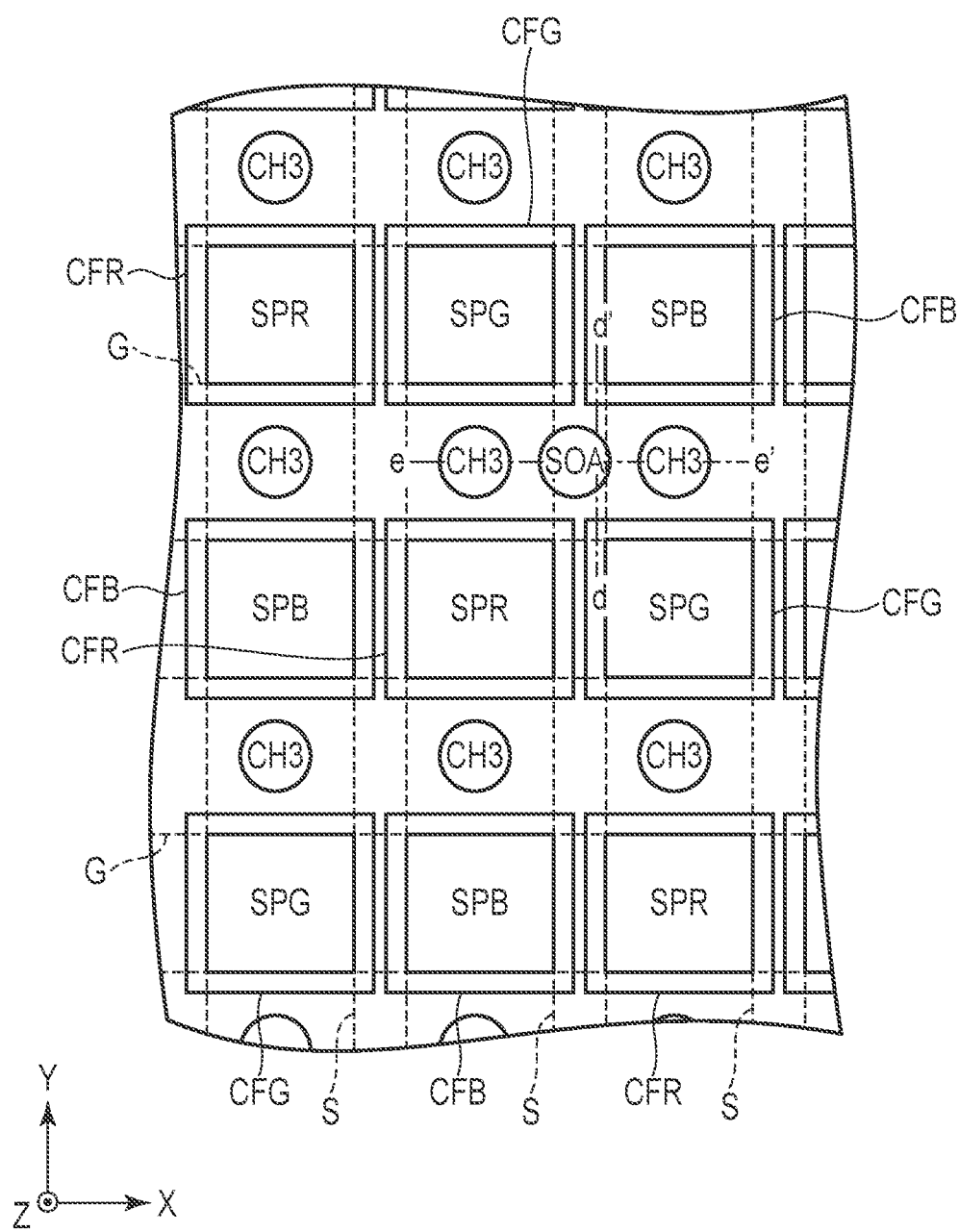
FIG. 8 is a diagram for describing a first comparative example.
Figure 9:
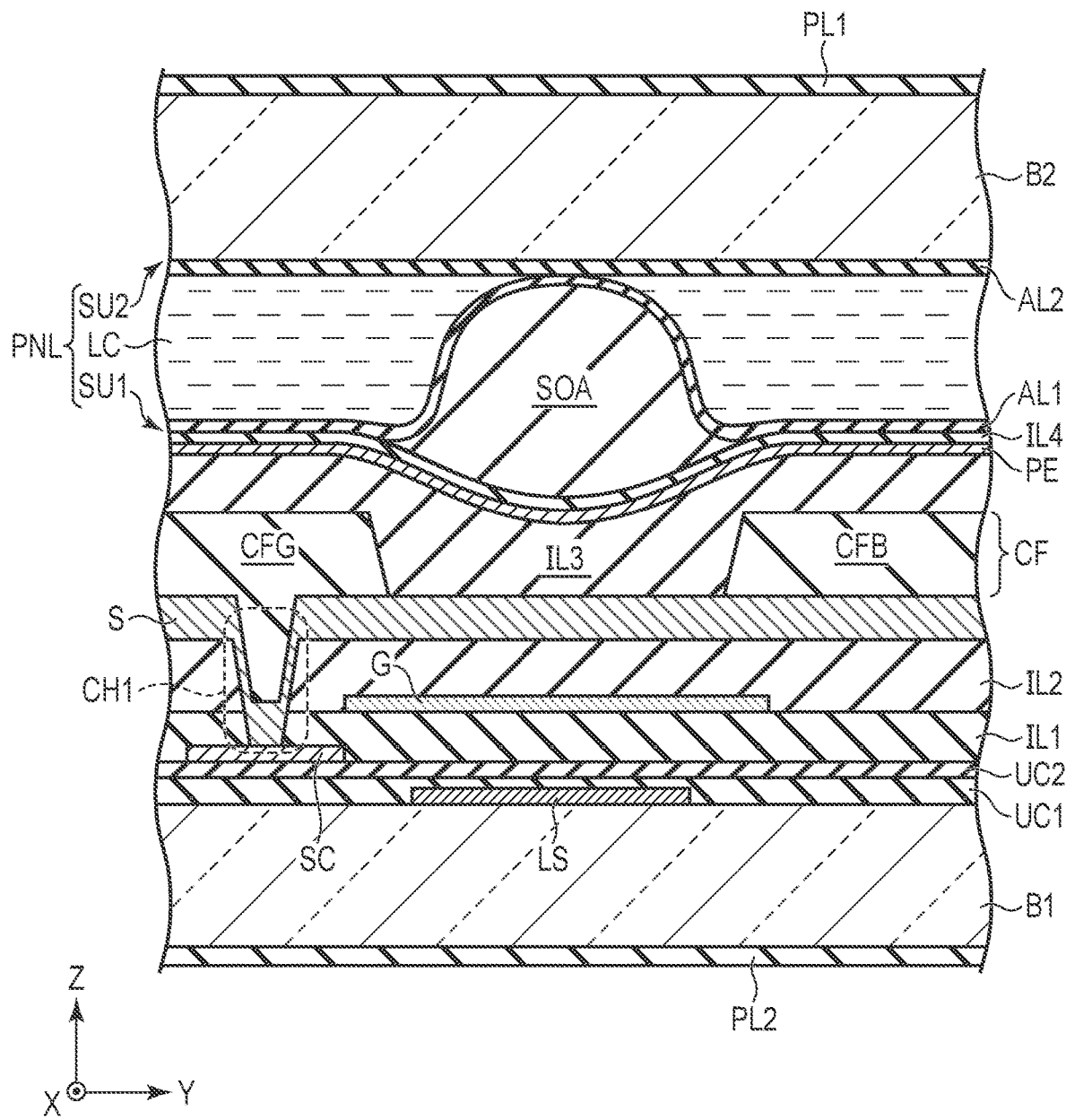
FIG. 9 is a schematic cross-sectional view of a display panel of the first comparative example, the cross-sectional view being taken along a d-d' line shown in FIG. 8.

FIG. 9 is a schematic cross-sectional view of the display panel of the first comparative example, the cross-sectional view including the spacer SOA shown in FIG. 8 and being taken along a d-d' line parallel with the signal line S. In FIG. 9, the same components as those in FIG. 6 are denoted by the same reference signs as those in FIG. 6.

As shown in FIG. 9, in the first comparative example, no color filter is formed under the spacer SOA. When it is assumed that an amount of deposition of the third insulating layer IL3 (flattening film) shown in FIG. 9 is the same as an amount of deposition of the same in the case shown in FIG. 6, as a result of addition of a part where no color filter is formed, an upper surface of the third insulating layer IL3 between the color filter CFG and the color filter CFB becomes downward concave in the first comparative example, in which the third insulating layer IL3 is not sufficiently flattened.

Figure 10:
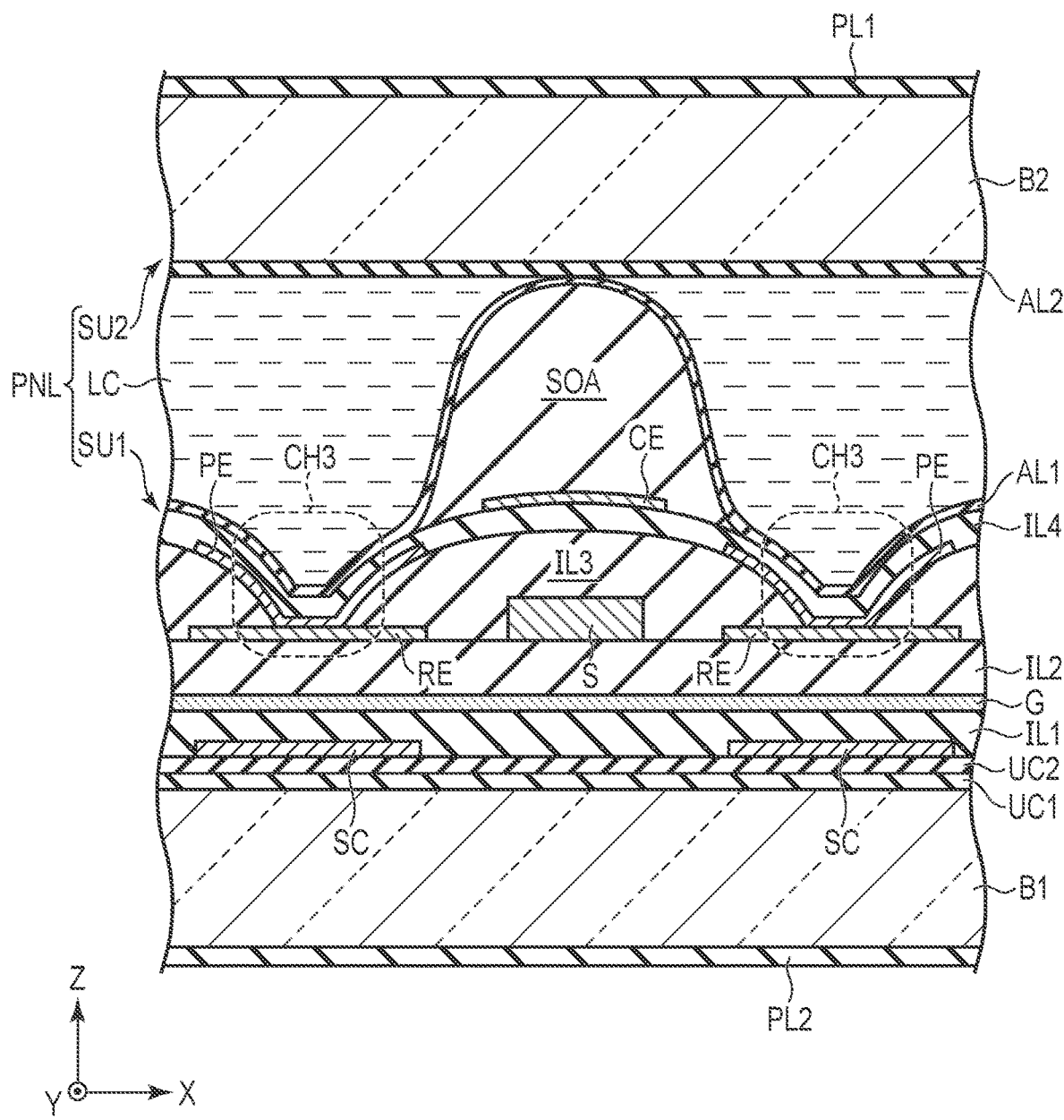
FIG. 10 is a schematic cross-sectional view of the display panel of the first comparative example, the cross-sectional view being taken along an e-e' line shown in FIG. 8.

FIG. 10 is a schematic cross-sectional view of the display panel according to the first comparative example, the cross-sectional view including the spacer SOA and the third contact holes CH3 shown in FIG. 8 and being taken along an e-e' line parallel with the scanning line G. In FIG. 10, the same components as those in FIG. 7 are denoted by the same reference signs as those in FIG. 7.

In the first comparative example shown in FIG. 10, the third contact holes CH3 are formed on the third insulating layer IL3 whose upper surface is downward concave, as described in FIG. 9. As a result, the section of the third contact hole CH3 is not of the inverted trapezoidal shape of the third contact hole CH3 of this embodiment (third contact hole CH3 shown in FIG. 7), and the third insulating layer IL3 becomes semi-elliptical (semi-cylindrical) on the signal line S.

As described above, in this embodiment, the spacer SOA has a substantially trapezoidal shape. However, as shown in FIGS. 9 and 10, the spacer SOA formed on the third insulating layer IL3 of a non-flat shape is not of a trapezoidal shape, and the top of the spacer SOA becomes convex. In such a case, the area where the spacer SOA is in contact with the second substrate SU2 becomes smaller, in which case the liquid crystal layer LC cannot be held sufficiently. As a result, the layer thickness of the liquid crystal layer LC becomes non-uniform.

In contrast, according to this embodiment, the spacer SOA (holding member) is disposed at the position overlapping the second filter part, the spacer SOA holding the gap between the first substrate SU1 and the second substrate SU2, in which gap the liquid crystal layer LC is formed. In this configuration, the substratum of the spacer SOA (post spacer) is secured to offer the spacer SOA whose top has preferable flatness. Hence, the liquid crystal layer LC can be held sufficiently.

Figure 11:
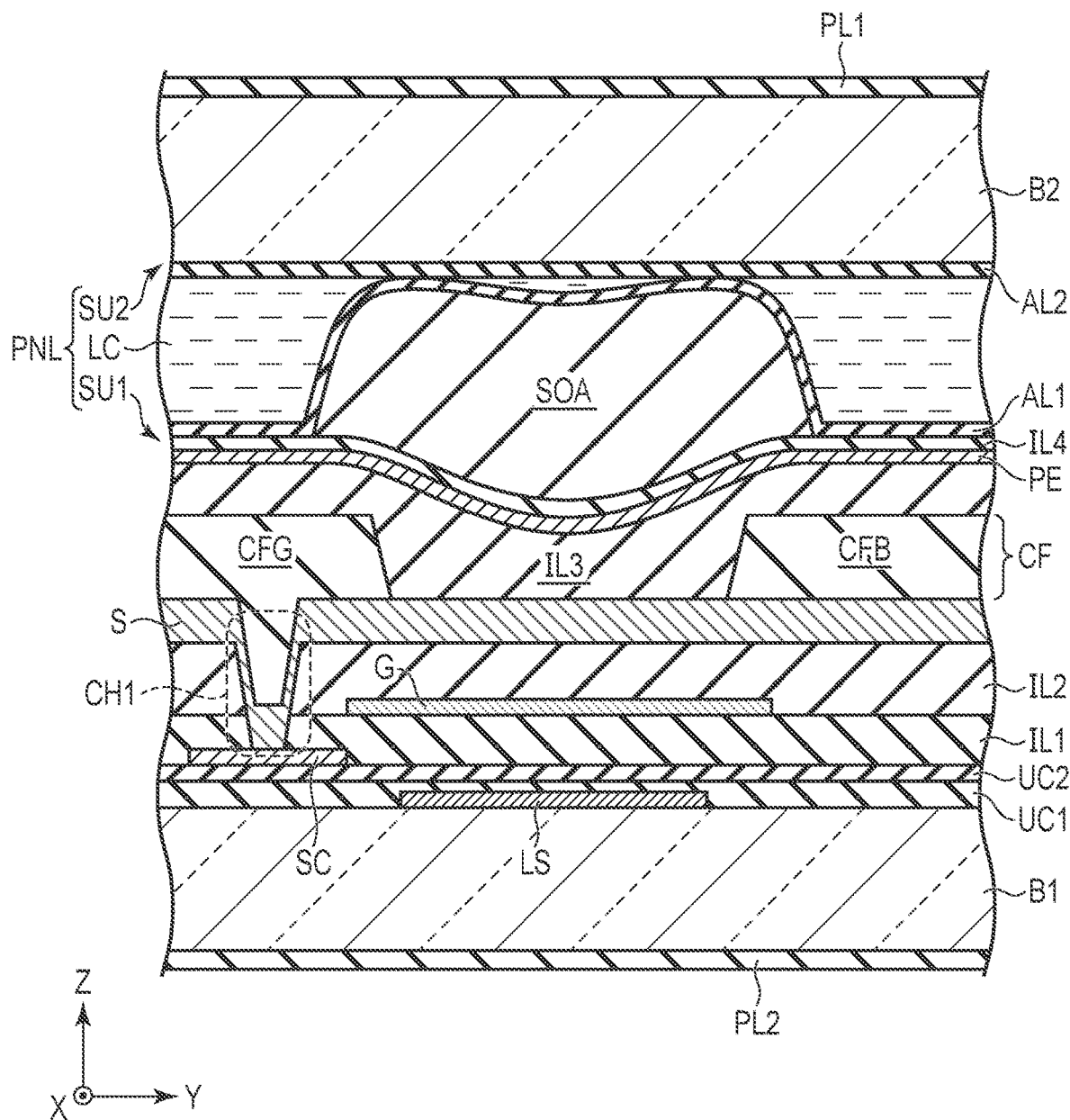
FIG. 11 is a schematic cross-sectional view of a display panel of a second comparative example.

In the above first comparative example, the liquid crystal layer LC cannot be held sufficiently. To deal with this problem, for example, a configuration in which the size of the spacer SOA of the first comparative example is increased (which will hereinafter be referred to as a second comparative example) might be adopted, as shown in FIG. 11.

According to the second comparative example, increasing the size of the spacer SOA allows an increase in the area of spacer SOA that is in contact with the second substrate SU2, in which case the layer thickness of the liquid crystal layer LC can be made further uniform. However, in the second comparative example, the spacer SOA with the increased size affects the opening, which leads to a drop in the contrast ratio of the display device.

In this embodiment, in contrast, the spacer SOA does not affect the opening, thus not causing a drop in the contrast ratio that does happens in the second comparative example.

Figure 13:
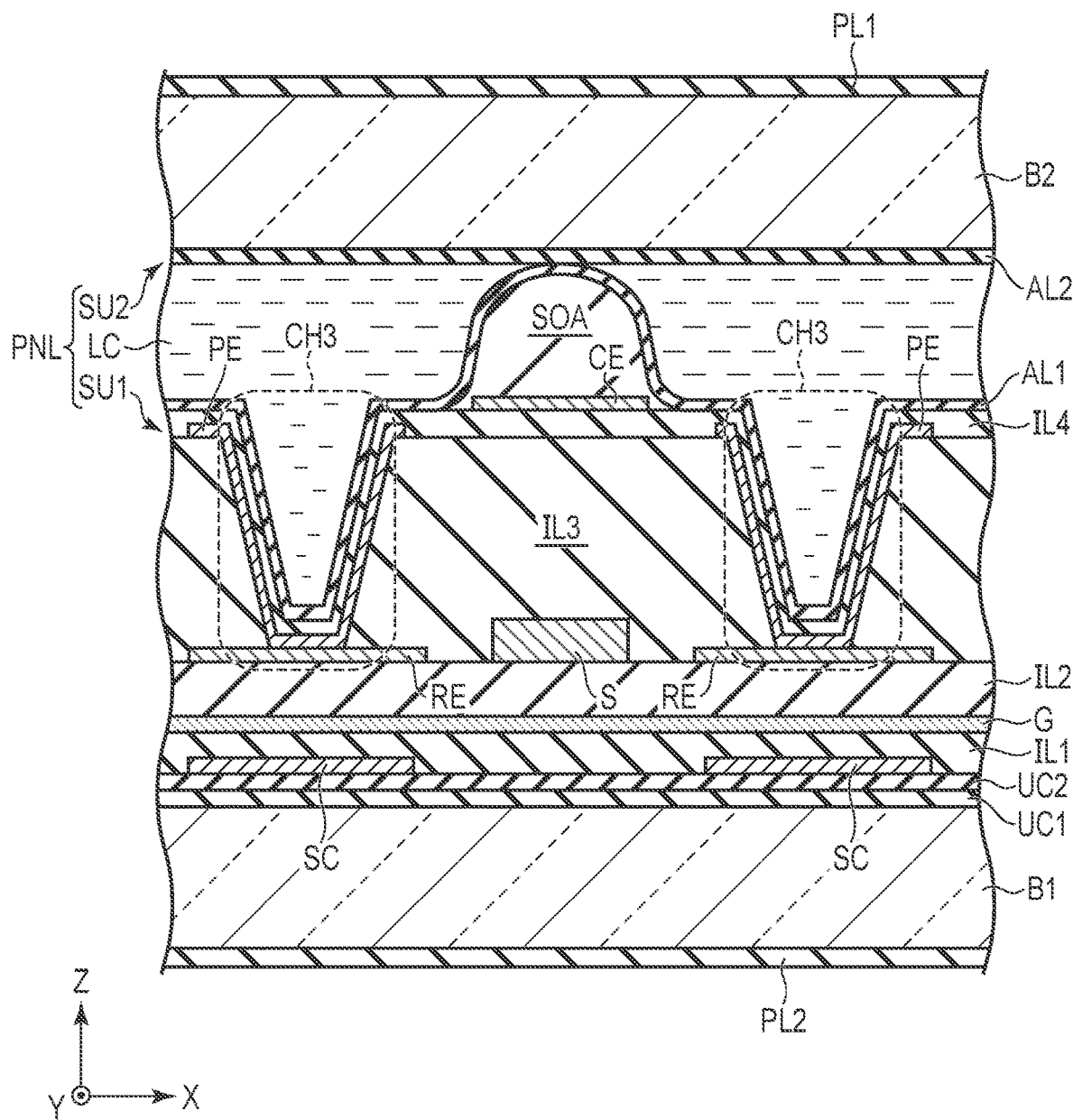
FIG. 13 is a schematic cross-sectional view of the display panel of the third comparative example.

Further, in the above first comparative example, the substratum on which the spacer SOA is disposed is not flattened. To deal with this problem, as shown in FIGS. 12 and 13, a configuration in which the film thickness of the third insulating layer IL3 of the first comparative example is increased (which will hereinafter be referred to as a third comparative example) might be adopted.

According to the third comparative example, the gap between the color filter CFG and the color filter CFB can be flattened. However, in the third comparative example, an increase in the film thickness of the third insulating layer IL3 results in an increase in the size of the third contact hole CH3. In this case, specifically, the third contact hole CH3 has a top diameter of, for example, 4.6 μm, a bottom diameter of, for example, 2.2 μm, and a depth (length in the Z direction) of, for example, 4.7 μm.

Now the spacer SOA needs to be disposed at a position not overlapping the third contact hole CH3 in a plan view. Because of this requirement, when the third contact hole CH3 of a large size as shown in FIG. 13 is formed, the area of the bottom of the spacer SOA needs to be reduced so that the spacer SOA does not overlap the third contact hole CH3. In this case, the sectional shape of the spacer SOA is changed into a shape as shown in FIGS. 12 and 13, which impairs the flatness of the top of the spacer SOA. As a result, the area of spacer SOA that is in contact with the second substrate SU2 reduces, making it impossible for the spacer SOA to hold the liquid crystal layer LC sufficiently.

In contrast, according to this embodiment, the third contact hole CH3 can be formed as a sufficiently small one. This allows securing the enough area of the bottom of the spacer SOA to provide the wider area of spacer SOA that is in contact with the second substrate SU2.

Specifically, in this embodiment, an area other than an area where the third contact holes CH3 are formed is widely covered with the color filters CFR, CFG, and CFB (that is, each gap between the color filters CFR, CFG, and CFB is reduced). This reduces the film thickness of a coat of the photoresist making up the third insulating layer IL3, thus achieving a reduction in the thickness of the third insulating layer IL3. As a result, the third contact hole CH3 of a sufficiently small size, which is, for example, well smaller than the third contact hole CH3 shown in FIG. 13, can be formed. In addition, since the third contact hole CH3 is formed in a gap surrounded by the color filters CFR, CFG, and CFB, the third contact hole CH3 can be formed in a stable manner.

Further, in this embodiment, the spacer SOA is disposed, for example, at a position overlapping the second filter part CFR2 included in the color filter CFR whose top is the flattest. This flattens the substratum on which the spacer SOA is disposed, thus allowing the spacer SOA to hold the liquid crystal layer LC stably.

In this embodiment, as described above, reducing the size of the third contact hole CH3 (reducing the film thickness of the third insulating layer IL3) and stably holding the liquid crystal layer LC (flattening the substratum of the spacer) are achieved simultaneously. As a result, a decline in the reliability of the display device DSP is prevented further, and, the display device with high-definition and high efficiency, which can be used as, for example, a VR viewer, is provided.

In this embodiment, the spacer SOA disposed at the position overlapping the second filter part CFR2 included in the color filter CFR has been described. The spacer SOA, however, may be disposed at a position overlapping the second filter part included in a color filter different in color from the color filter CFR. A color displayed by the sub-pixel SP corresponding to the color filter formed at the position overlapping the spacer SOA (that is, the sub-pixel SP whose opening is covered with the color filter) may become different from a color displayed by a different sub-pixel SP due to disturbance of alignment of the liquid crystal layer LC (liquid crystal molecules), the disturbance being caused by the spacer SOA disposed. In this case, given the fact that the human eyes' color resolution ability shows weak sensitivity to blue and low transmittance against blue, the spacer SOA may be disposed at a position overlapping the second filter part CFB2 included in the color filter CFB.

In this embodiment, sub-pixels SP displaying the same color (first and second pixels) among the plurality of sub-pixels SP are adjacent to each other in the diagonal direction relative to the X direction (first direction) and the Y direction (second direction) in which the sub-pixels SP are arranged (that is, groups of sub-pixels SPR, SPG, and SPB are lined up in such a way as to form diagonal stripes for respective colors), as shown in FIG. 5.

In general, known color filter arrangement patterns include a stripe arrangement pattern in which color filters of the same color are lined up in a stripe pattern in the Y direction, and a mosaic arrangement pattern in which, as in the case of this embodiment, color filters of the same color are lined up in the diagonal direction relative to the X direction and the Y direction (i.e., diagonal direction intersecting the X direction and the Y direction). In the mosaic arrangement pattern, color filters CFR, CFG, and CFB are lined up in this order in the X direction, and are lined up in the same order also in the Y direction. The mosaic arrangement pattern allows delicate color expressions, and is therefore particularly suitable for such a product such as a VR viewer. In an application that requires high resolution, such as the case of a VR viewer, it is preferable that the sub-pixel SP be enhanced in definition to achieve, for example, 1000 ppi or more, and, more preferably, to achieve 2000 ppi or more. For example, the sub-pixel SP with definition of 2000 ppi according to this embodiment has an aspect ratio of 4:3 (Y direction: X direction), and a size of, for example, 8.4 µm×6.3 µm. In addition to such high definition performance, the color filters CFR, CFG, and CFB are arranged in the X direction and the Y direction in a dispersive manner. As a result, the user's eyes hardly recognize non-uniformity in display in the X direction and the Y direction.

In this embodiment, as described above, the second filter part included in each of the color filters (first and second color filters) corresponding respectively to the sub-pixels SP adjacent to each other in the diagonal direction and displaying the same color is formed at a position outside the straight line along the diagonal direction (that is, not disposed on the straight line). Specifically, for example, when the sub-pixels SPR (the color filters CFR corresponding thereto) are adjacent to each other in the direction of heading from the upper left side to the lower right side, as shown in FIG. 5, the second filter part CFR2 included in each color filter CFR is on the upper right side to the first filter part CFR1 and is connected thereto (that is, the first filter part CFR1 and the second filter part CFR2 are formed in such a way as to be lined up in the direction of heading from the lower left side to the upper right side). This configuration applies also the other color filters CFG and CFB different from the color filter CFR. According to this embodiment, the color filters CFR, CFG, and CFB corresponding respectively to the plurality of sub-pixels SP can be formed in such a way as be separated from each other. This offers an advantage that a developer easily permeates during a development process, which suppresses production of residues of the photoresist (color resist) around the color filters, the photoresist being used to form the color filters CFR, CFG, and CFB, thus facilitating optical contact.

Although the shape and arrangement of the color filters CFR, CFG, and CFB in this embodiment have been described with reference to FIG. 5, the shape and arrangement of the color filters CFR, CFG, and CFB may be different from those shown in FIG. 5.

First to third modifications will hereinafter be described as modifications of this embodiment. FIG. 14 depicts a first modification of this embodiment.

In the first modification, respective second filter parts included in color filters corresponding respectively to sub-pixels SP adjacent to each other in a diagonal direction and displaying the same color are lined up on a straight line along the diagonal direction. As shown in FIG. 14, for example, when the sub-pixels SPR are adjacent to each other in the direction of heading from the upper left side to the lower right side, the second filter part CFR2 included in each of the color filters CFR corresponding to the sub-pixels SPR is on the left upper side to the first filter part CFR1 and is connected thereto. In this case, the first filter part CFR1 included in the color filter CFR (first color filter) corresponding to one sub-pixel SPR of two sub-pixels SP adjacent to each other in the diagonal direction is connected also to the second filter part CFR2 included in the color filter CFR (second color filter) corresponding to the other sub-pixel SPR of the two sub-pixels SP. Such a configuration offers an advantage that a multiplier effect resulting from the increased area of the color filter CFR prevents peeling of the color filter CFR, thus facilitating formation of the color filter CFR. Although the first modification has been described for the case of the color filter CFR, the first modification applies also to the other color filters CFG and CFB in the same manner.

In the first modification, in the same manner as in this embodiment described above, the first filter part included in each of the color filters CFR, CFG, and CFB covers the opening of the sub-pixel SP, and the spacer SOA is disposed at the position overlapping the second filter part. In the example of FIG. 14, the spacer SOA is disposed at the position overlapping the second filter part CFG2 included in the color filter CFG.

FIG. 15 depicts a second modification of this embodiment. In the second modification, a color filter corresponding to a sub-pixel SP displaying one color among the plurality of sub-pixels SPR, SPG, and SPB is formed in such a way as to include the first filter part and the second filter part, and color filters corresponding to the other sub-pixels SP displaying the other colors are each formed in such a way as to include the single island structure corresponding to the first filter part.

In the example shown in FIG. 15, the color filter CFG among the color filters CFR, CFG, and CFB is formed in such a way as to include the first filter part CFG1 and the second filter part CFG2, while the color filters CFR and CFB are each formed as the single island structure.

In this configuration, the color filter CFG has a planar shape in which the first filter part CFG1 and the second filter part CFG2 (large and small rectangular parts) are connected together. In the second modification, in particular, the second filter part CFG2 is connected to the first filter part CFG1 at four apexes of the first filter part CFG1.

The color filters CFR and CFB, on the other hand, each has a rectangular shape as large as the first filter part CFG1 included in the color filter CFG.

Some color filters are apt to peel off or to produce residues during a manufacture (formation) process. A color filter's peeling off leaves a bright spot, and production of residues renders optical contact impossible, thus readily creating a dark spot. These problems may cause a decline in display quality. To prevent peeling of the color filter, the area of the color filter is increased. To suppress production of residues, each color filter is formed into an island shape to separate it from other color filters.

In the second modification, as the above-mentioned fact of the color filter CFG being easy to peel off is taken into consideration, the first filter parts CFG1 and the second filter parts CFG2 included respectively in the plurality of color filters CFG are connected consecutively in the diagonal direction (direction of heading from the upper left side to the lower right side) to form the color filter CFG of a planar shape with a large area. According to this configuration, peeling of the color filter CFG can be prevented. The color filters CFR and CFB are apt to produce residues. In the second modification, however, the color filters CFR and CFB are each formed as an island structure surrounded by the color filters CFG. According to this configuration, production of residues by the color filters CFR and CFB can be suppressed. In summary, according to the second modification, preventing filter peeling and suppressing residue production can be achieved at the same time.

In the second modification, each of the color filter CFR, the first filter part CFG1 included in the color filter CFG, and the color filter CFB covers the opening of the sub-pixel SP, and the spacer SOA is disposed at the position overlapping the second filter part CFG2 included in the color filter CFG.

Figure 16:
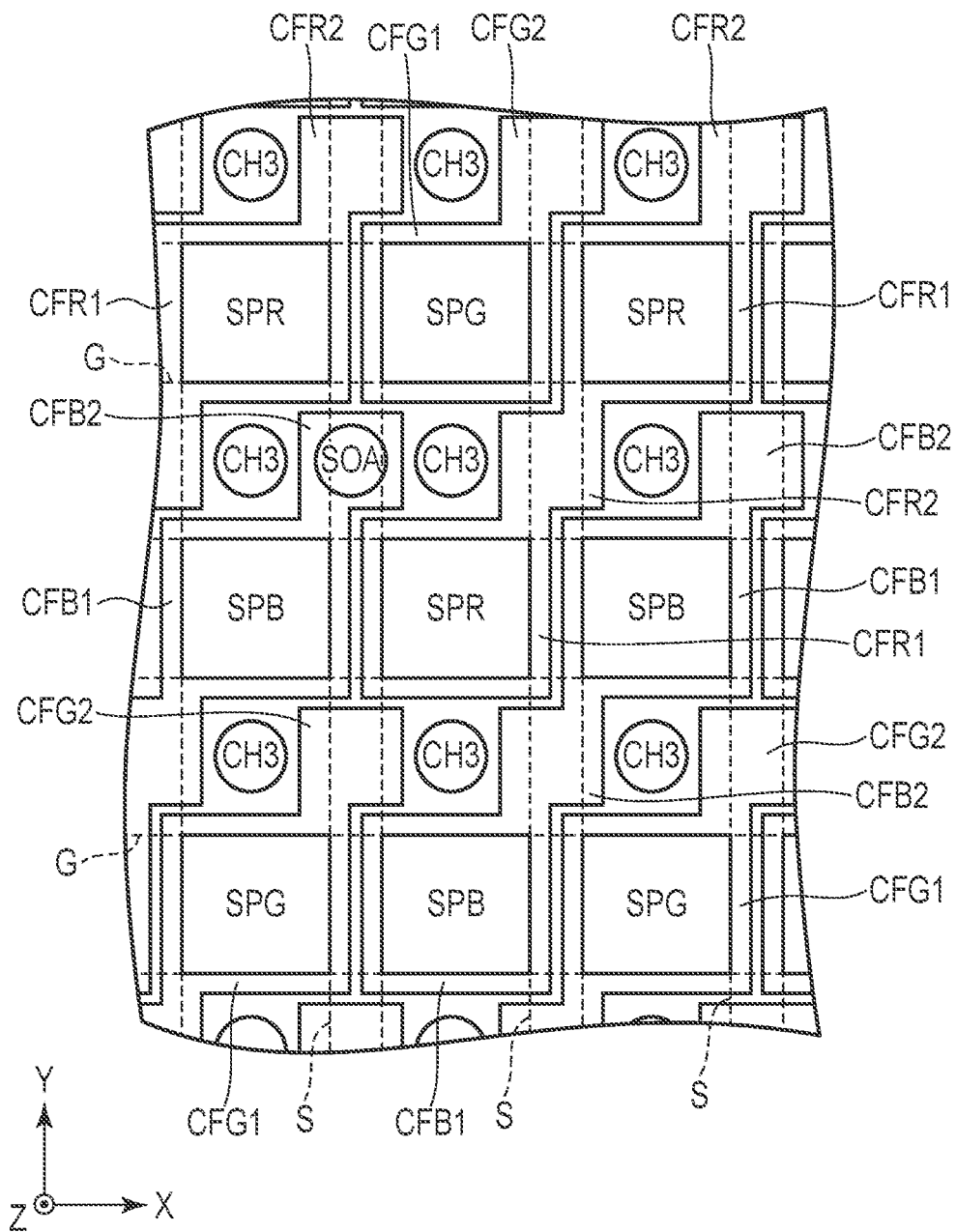
FIG. 16 depicts a third modification.

FIG. 16 depicts a third modification of this embodiment. In the third modification, the sub-pixel SPR is disposed between the two sub-pixels SPB lined up in the X direction (first direction), the sub-pixel SPG is disposed between the two sub-pixels SPR lined up in the X direction, the sub-pixel SPB is disposed between the two sub-pixels SPG lined up in the X direction, and each of the sub-pixels SPR, SPG, and SPB is adjacent to a sub-pixel SP that displays a different color in the Y direction (second direction).

In other words, the third modification has a configuration in which, as shown in FIG. 16, color filters (sub-pixels SP) of the same color are arranged laterally in a zigzag pattern of alternately repeating an upward shift equivalent to one-pixel and a downward shift equivalent to one-pixel.

For example, in a set of two sub-pixels SPR adjacent to each other in a diagonal direction relative to the X direction and the Y direction, the first filter part CFR1 included in the color filter CFR corresponding to one of the two sub-pixels SPR is connected to the second filter part CFR2 included in the color filter CFR corresponding to the other of the two sub-pixels SPR. Similarly, in a set of two sub-pixels SPG adjacent to each other in the diagonal direction relative to the X direction and the Y direction, for example, the first filter part CFG1 included in the color filter CFG corresponding to one of the two sub-pixels SPG is connected to the second filter part CFG2 included in the color filter CFG corresponding to the other of the two sub-pixels SPG. Further, in a set of two sub-pixels SPB adjacent to each other in the diagonal direction relative to the X direction and the Y direction, for example, the first filter part CFB1 included in the color filter CFB corresponding to one of the two sub-pixels SPB is connected to the second filter part CFB2 included in the color filter CFB corresponding to the other of the two sub-pixels SPB.

In the example of FIG. 16, for example, in a set of two color filters CFR corresponding respectively to two sub-pixels SPR adjacent to each other in the direction of heading from the left lower side to the right upper side, the first filter part CFR1 included in the color filter CFR corresponding to the sub-pixel SPR on the upper right side is connected to the second filter part CFR2 included in the color filter CFR corresponding to the sub-pixel SPR on the lower left side. This configuration applies also the color filters CFG and CFB.

In FIG. 16, the second filter part included in each color filter is connected to the first filter part at the position of the upper right apex of the first filter part. The second filter part, however, may be connected to the first filter part at the position of the upper left apex of the first filter part. In that case, two color filters are connected to each other in the direction of heading from the upper left side to the lower right side.

In the third modification described above, the changed repetitive pattern of arrangement of the color filters CFR, CFG, and CFB offers an advantage that, compared with this embodiment shown in FIG. 5, non-uniformity in display in the diagonal direction of heading from the upper left side to the lower right side is hardly recognized. The third modification is thus suitable for, for example, displaying a natural image, etc., not including many lattice patterns.

In the third modification, the first filter part included in each of the color filters CFR, CFG, and CFB covers the opening of the sub-pixel SP corresponding to each color filter, and the spacer SOA is disposed at the position overlapping the second filter part. In the example of FIG. 16, the spacer SOA is disposed at the position overlapping the second filter part CFB2 included in the color filter CFB.

The first to third modifications of this embodiment have been described. According to this embodiment, each of the color filters corresponding respectively to the plurality of sub-pixels SP displaying at least one color is formed in such a way as to include the first filter part and the second filter part. The embodiment applying to one color filter may apply also to the other color filters as to their shape and arrangement. The configurations of this embodiment and first to third modifications described above may be selected properly according to applications in which the display device DSP is used.

Figure 17:
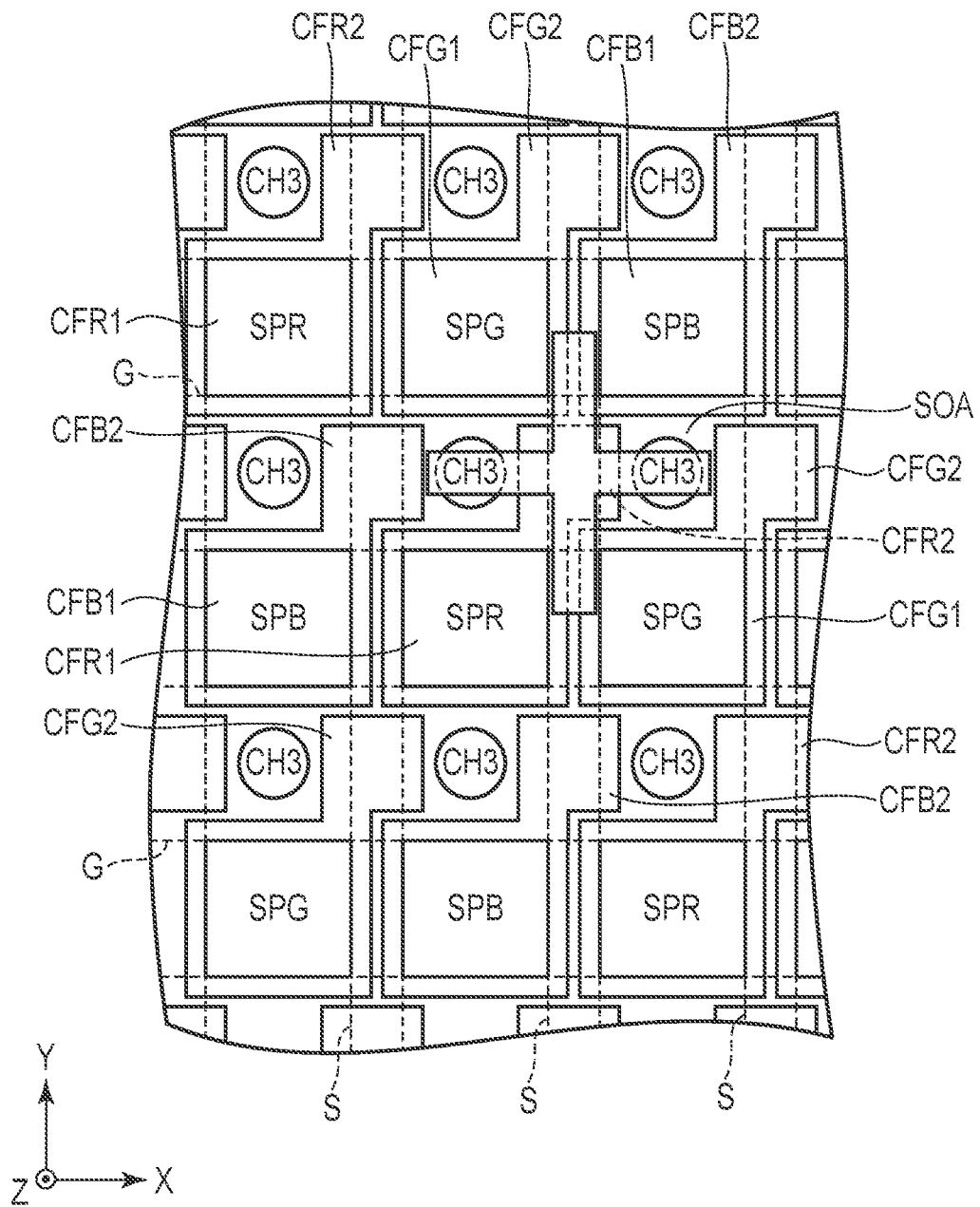
FIG. 17 depicts another example of a spacer.

In this embodiment, the spacer SOA has been described as one formed into a columnar shape. The spacer SOA, however, may be formed to have a different shape. Specifically, as shown in FIG. 17, the spacer SOA may be formed as a spacer of a cross column structure. The spacer SOA shown in FIG. 17 has a structure in which, for example, a columnar (rectangular parallelepiped) first spacer (first holding member) extending in the X direction in the same manner as the scanning line G formed on the first substrate SU1 side and a columnar (rectangular parallelepiped) second spacer (second holding member) extending in the Y direction in the same manner as the signal line S formed on the second substrate SU2 side are brought into contact with each other to form a cross shape. Adopting such a spacer SOA allows suppressing disturbance of the alignment of the liquid crystal layer LC.

In this embodiment, because the spacer SOA is disposed at the position overlapping the second filter part (the area where the scanning line G and the signal line S intersect), the spacer SOA is shielded from light by the signal line S and the scanning line G. However, a light-shielding layer that shields the spacer SOA from light may be provided separately.

In this embodiment, the common electrode CE is disposed between the pixel electrode PE and the liquid crystal layer LC. In this case, in comparison with a configuration in which the pixel electrode PE is disposed between the common electrode CE and the liquid crystal layer LC, the distance between the pixel electrode PE and the relay electrode RE is shorter. The size (diameter and depth) of the third contact hole CH3, therefore, can be reduced. This embodiment, however, may apply to the configuration in which the pixel electrode PE is disposed between the common electrode CE and the liquid crystal layer LC.

Figure 18:
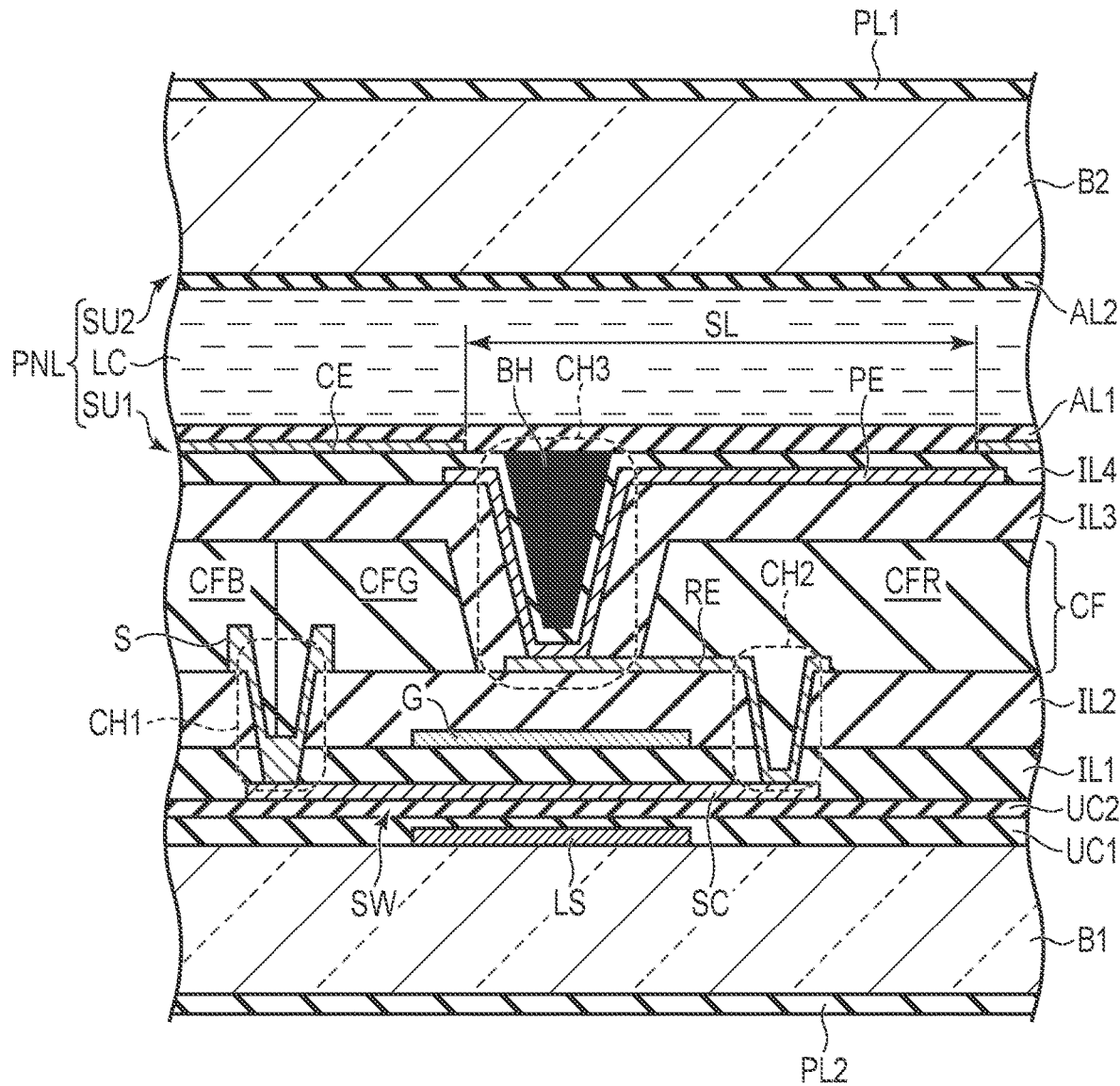
FIG. 18 depicts a configuration in which a black layer is disposed in a third contact hole.

In this embodiment, for example, a black layer BH (light-shielding layer) may be disposed in the third contact hole CH3, as shown in FIG. 18. As the black layer BH, for example, a black photoresist created by mixing a black pigment into a positive photoresist can be used.

In this embodiment, no color filter is formed at the position where the third contact hole CH3 is formed. In such a configuration, when the scanning line G is reduced in width to increase the aperture ratio, color mixing may occur due to a transmitted light component passing through the third contact hole CH3. Providing the black layer BH shown in FIG. 18, however, prevents the color mixing. Besides, in the configuration in which the black layer BH fills the third contact hole CH3, the first alignment film AL1 covering the third contact hole CH3 can be flattened. This allows suppressing disturbance of the alignment of the liquid crystal layer LC in the vicinity of the third contact hole CH3.

Based on the display device which has been described in the above-described embodiments, a person having ordinary skill in the art may achieve a display device with an arbitral design change; however, as long as they fall within the scope and spirit of the present invention, such a display device is encompassed by the scope of the present invention.

A skilled person would conceive various changes and modifications of the present invention within the scope of the technical concept of the invention, and naturally, such changes and modifications are encompassed by the scope of the present invention. For example, if a skilled person adds/deletes/alters a structural element or design to/from/in the above-described embodiments, or adds/deletes/alters a step or a condition to/from/in the above-described embodiment, as long as they fall within the scope and spirit of the present invention, such addition, deletion, and altercation are encompassed by the scope of the present invention.

Furthermore, regarding the present embodiments, any advantage and effect those will be obvious from the description of the specification or arbitrarily conceived by a skilled person are naturally considered achievable by the present invention.

What is claimed is:

1. A display device comprising:
a first substrate; and
a second substrate counter to the first substrate, wherein the first substrate includes:
a plurality of pixels arranged on the first substrate; and
a plurality of color filters corresponding to the plurality of pixels,
the plurality of pixels are arranged in a first direction and a second direction in a matrix form and include a first pixel and a second pixel that display an identical color,
the second pixel is disposed in a diagonal direction relative to the first pixel, the diagonal direction being diagonal to the first direction and the second direction, and
each of a first color filter of the plurality of color filters, the first color filter corresponding to the first pixel, and a second color filter of the plurality of color filters, the second color filter corresponding to the second pixel, includes: a first filter part formed at a position overlapping an opening of a pixel corresponding to the color filter in plan view; and a second filter part at least partially connected to the first filter part, the second filter part being formed at a position overlapping a non-opening area of the pixel in plan view.

2. The display device according to claim 1, wherein the first filter part and the second filter part each have a rectangular shape, and
the second filter part is smaller in area than the first filter part.

3. The display device according to claim 2, wherein the second filter part included in each of the first color filter corresponding to the first pixel and the second color filter corresponding to the second pixel is formed at a position outside a straight line along a diagonal direction in which the first and second pixels are adjacent to each other.

4. The display device according to claim 2, wherein the second filter part included in each of the first color filter corresponding to the first pixel and the second color filter corresponding to the second pixel is formed on a straight line along a diagonal direction in which the first and second pixels are adjacent to each other, and
a first filter part included in the first color filter is further connected to a second filter part included in the second color filter.

5. The display device according to claim 1, wherein the second filter part is formed at a position overlapping an area where a scanning line supplied with a scanning signal and a signal line supplied with a video signal intersect.

6. The display device according to claim 1, further comprising:
a liquid crystal layer disposed between the first substrate and the second substrate; and
a holding member configured to hold a gap between the first substrate and the second substrate that have the liquid crystal layer formed therebetween, wherein the holding member is disposed at a position overlapping the second filter part in a plan view.

7. The display device according to claim 6, wherein the holding member is disposed at a position overlapping a second filter part included in a color filter corresponding to a pixel that displays a specific color among the plurality of pixels.

8. The display device according to claim 7, wherein the specific color is blue.

9. The display device according to claim 6, wherein the holding member includes a first holding member extending in a first direction in plan view and provided on the first substrate, and a second holding member extending in a second direction in plan view and provided on the second substrate.

10. A display device comprising:
a first substrate; and
a second substrate counter to the first substrate, wherein the first substrate includes:
a plurality of pixels arranged on the first substrate; and
a plurality of color filters corresponding to the plurality of pixels,
each of the plurality of color filters includes: a first filter part overlapping an opening of a pixel corresponding to the color filter in plan view; and a second filter part at least partially connected to the first filter part, the second filter part being formed at a position overlapping a non-opening area of the pixel in plan view,
the plurality of pixels include a first pixel that displays a first color, a second pixel that displays a second color, and a third pixel that displays a third color, and are arranged in a first direction and a second direction in a matrix form,
the first pixel is disposed between two of the third pixels arranged in the first direction,
the second pixel is disposed between two of the first pixels arranged in the first direction,
the third pixel is disposed between two of the second pixels arranged in the first direction,
each of the first pixel, the second pixel, and the third pixel is adjacent to a pixel that displays a different color in the second direction,
in two of the first pixels adjacent to each other in a diagonal direction relative to the first direction and the second direction, a first filter part included in a color filter corresponding to one first pixel of the two of the first pixels is further connected to a second filter part included in a color filter corresponding to the other first pixel of the two of the first pixels, in two of the second pixels adjacent to each other in a diagonal direction relative to the first direction and the second direction, in two of the second pixels adjacent to each other in a diagonal direction relative to the first direction and the second direction, a first filter part included in a color filter corresponding to one second pixel of the two of the second pixels is further connected to a second filter part included in a color filter corresponding to the other second pixel of the two of the second pixels, and in two of the third pixels adjacent to each other in a diagonal direction relative to the first direction and the second direction, in two of the third pixels adjacent to each other in a diagonal direction relative to the first direction and the second direction, a first filter part included in a color filter corresponding to one third pixel of the two of the third pixels is further connected to a second filter part included in a color filter corresponding to the other third pixel of the two of the third pixels" change into "in two of the first pixels adjacent to each other in a diagonal direction relative to the first direction and the second direction, the first filter part included in a color filter corresponding to one first pixel of the two of the first pixels is further connected to a second filter part included in a color filter corresponding to the other first pixel of the two of the first pixels, in two of the second pixels adjacent to each other in a diagonal direction relative to the first direction and the second direction, the first filter part included in a color filter corresponding to one second pixel of the two of the second pixels is further connected to a second filter part included in a color filter corresponding to the other second pixel of the two of the second pixels, and in two of the third pixels adjacent to each other in a diagonal direction relative to the first direction and the second direction, the first filter part included in a color filter corresponding to one third pixel of the two of the third pixels is further connected to a second filter part included in a color filter corresponding to the other third pixel of the two of the third pixels.

11. The display device according to claim 10, wherein the second filter part is formed at a position overlapping an area where a scanning line supplied with a scanning signal and a signal line supplied with a video signal intersect.

12. The display device according to claim 10, further comprising:
a liquid crystal layer disposed between the first substrate and the second substrate; and
a holding member configured to hold a gap between the first substrate and the second substrate that have the liquid crystal layer formed therebetween, wherein
the holding member is disposed at a position overlapping the second filter part in a plan view.

13. The display device according to claim 12, wherein the holding member is disposed at a position overlapping a second filter part included in a color filter corresponding to a pixel that displays a specific color among the plurality of pixels.

14. The display device according to claim 13, wherein the specific color is blue.

15. The display device according to claim 11, wherein the holding member includes a first holding member extending in a first direction in plan view and provided on the first substrate, and a second holding member extending in a second direction in plan view and provided on the second substrate.

* * * * *